(12) United States Patent
Morrison et al.

(10) Patent No.: US 10,228,771 B2
(45) Date of Patent: Mar. 12, 2019

(54) SYSTEM AND METHOD OF POINTER DETECTION FOR INTERACTIVE INPUT

(71) Applicant: SMART Technologies ULC, Calgary (CA)

(72) Inventors: Gerald Morrison, Calgary (CA); David Holmgren, Calgary (CA); Clinton Lam, Calgary (CA)

(73) Assignee: SMART TECHNOLOGIES ULC, Calgary (CA)

(*) Notice: Subject to any disclaimer, the term of this patent is extended or adjusted under 35 U.S.C. 154(b) by 173 days.

(21) Appl. No.: 15/272,984

(22) Filed: Sep. 22, 2016

(65) Prior Publication Data
US 2017/0090598 A1 Mar. 30, 2017

Related U.S. Application Data

(60) Provisional application No. 62/233,079, filed on Sep. 25, 2015.

(51) Int. Cl.
G06F 3/042 (2006.01)
G06F 3/03 (2006.01)
(Continued)

(52) U.S. Cl.
CPC ........ *G06F 3/0304* (2013.01); *G06F 3/03545* (2013.01); *G06F 3/046* (2013.01); *G06F 3/0416* (2013.01); *G06F 3/0421* (2013.01); *G06F 2203/0382* (2013.01); *G06F 2203/04109* (2013.01)

(58) Field of Classification Search
None
See application file for complete search history.

(56) References Cited

U.S. PATENT DOCUMENTS

2002/0021003 A1* 2/2002 McGrew ............... B41M 3/144
283/93
2009/0277694 A1* 11/2009 Hansen ................ G06F 3/0421
178/18.03

(Continued)

OTHER PUBLICATIONS

Dictionary.com definition of pattern, http://www.dictionary.com/browse/pattern?s=t, p. 1.*

(Continued)

*Primary Examiner* — Abdul-Samad A Adediran
*Assistant Examiner* — Kirk W Hermann
(74) *Attorney, Agent, or Firm* — King & Schickli, PLLC

(57) ABSTRACT

The present invention relates to a method and system for determining an optical property of a pointer used in an interactive touch system. The interactive device having a touch area; a plurality of emitters on the periphery of the touch area; the emitters emitting an intensity of light into the touch area; a plurality of pointers having a distinct optical property responsive to the light; at least one detector having a field of view of the touch area. The processing structure, in communication with the emitters and the at least one detector, executes instructions from a memory to: transmit an emitter signal to at least one of the emitters initiating emission of light at the first frequency; receive at least one detector signal from the at least one detector; and determine the distinct optical property from the at least one detector signal.

46 Claims, 19 Drawing Sheets

(51) Int. Cl.
G06F 3/041 (2006.01)
G06F 3/046 (2006.01)
G06F 3/0354 (2013.01)

(56) References Cited

U.S. PATENT DOCUMENTS

| | | | | |
|---|---|---|---|---|
| 2011/0234542 A1* | 9/2011 | Marson | ................ | G06F 3/0418 345/175 |
| 2011/0241987 A1* | 10/2011 | Howse | ................ | G06F 3/0421 345/158 |
| 2013/0257825 A1* | 10/2013 | Thompson | .......... | G06F 3/03542 345/179 |
| 2016/0022181 A1* | 1/2016 | Valsan | ............... | A61B 5/02007 600/324 |

OTHER PUBLICATIONS

Dictionary.com definition of intensity, http://www.dictionary.com/browse/intensity?s=t, p. 1.*
Google.com definition of therethrough, http://www.google.com, p. 1.*
Dictionary.com definition of periphery, http://www.dictionary.com/browse/pattern?s=t, p. 1.*
Google definition of therethrough, www.google.com, 2018, p. 1.*

* cited by examiner

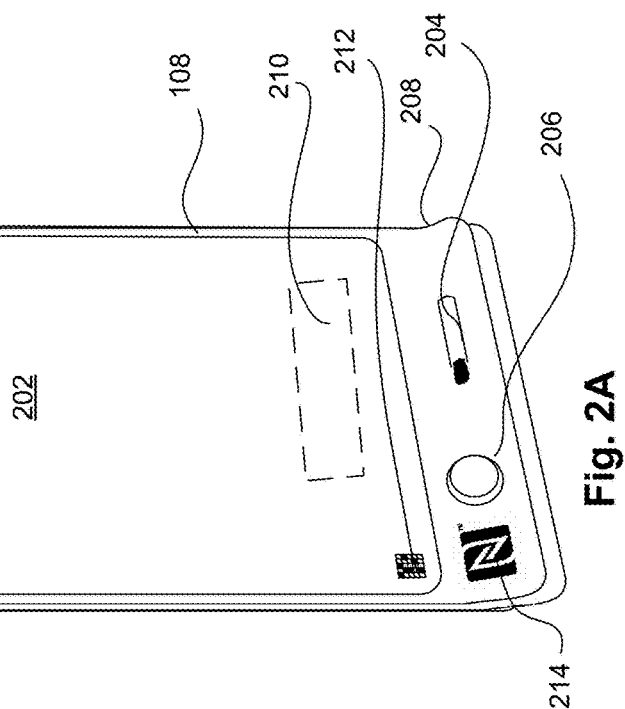
Fig. 2B
Fig. 2A

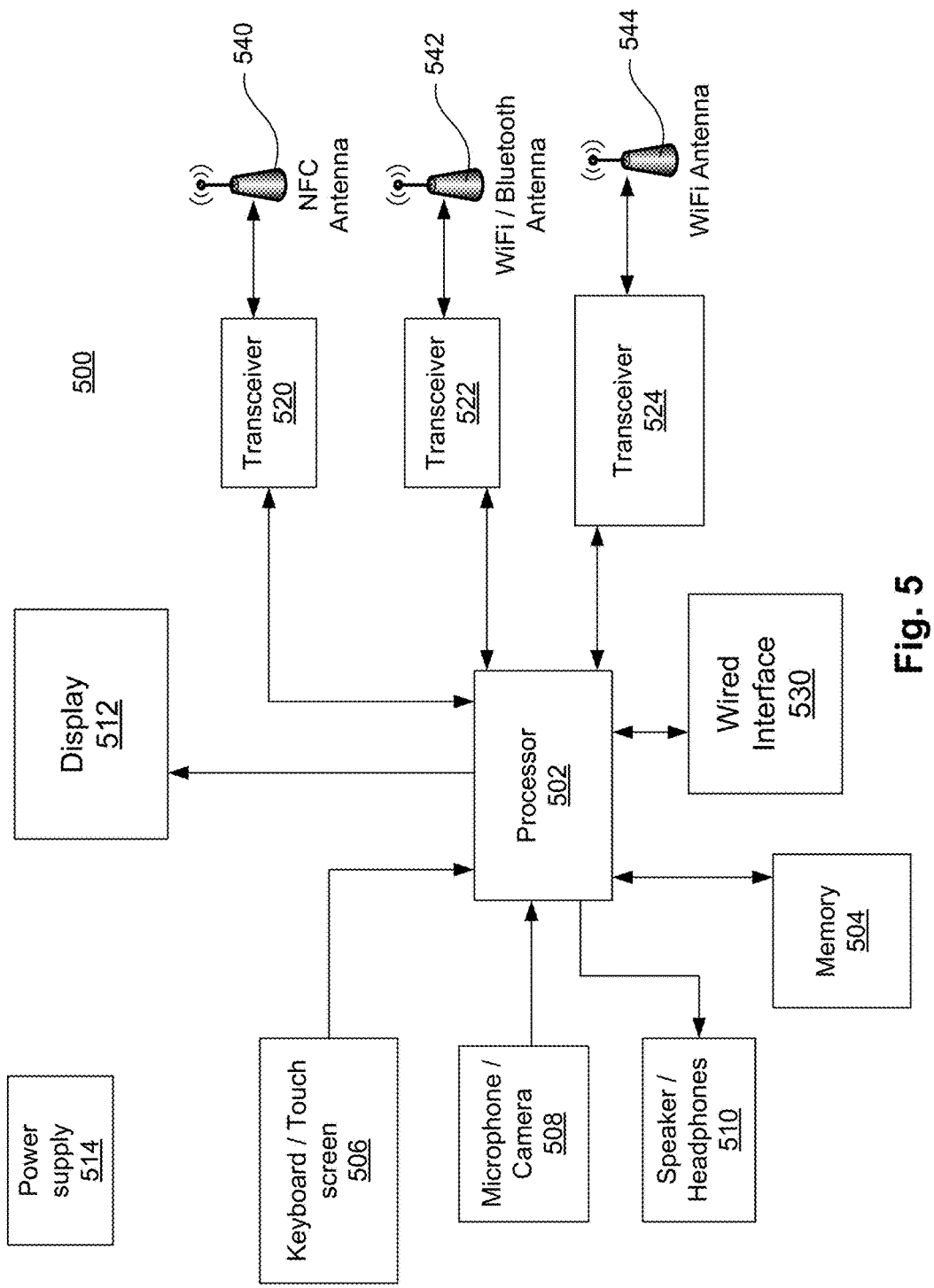

SYSTEM AND METHOD OF POINTER DETECTION FOR INTERACTIVE INPUT

CROSS-REFERENCE TO RELATED APPLICATIONS

This application claims the benefit of U.S. Provisional Application No. 62/233,079 to Morrison et al. filed on Sep. 25, 2015, the entire content of which is expressly incorporated herein by reference.

FIELD OF THE INVENTION

The present invention relates generally to an improved method of pointer detection for an interactive touch system. More particularly, the present invention relates to a method and system for determining an optical property of a pointer used in an interactive touch system.

BACKGROUND OF THE INVENTION

With the increased popularity of multiuser large-screen human-computer interfaces, user interface tools for each user are provided while maximizing screen real estate. Furthermore, a particular pointer is identified; the interaction of each user is managed and recorded to the workspace and subsequently recorded to each user's individual device, such as a smart phone or software platforms that provide a service remotely through the Internet. Such networked services have storage for user data and profiles in the "cloud" using services such as Facebook®, Google Cloud storage, Dropbox®, Microsoft OneDrive®, or other services known in the art.

U.S. Pat. No. 7,532,206 to SMART Technologies ULC, the entirety of the specification incorporated by reference, discloses a touch system and method that differentiates between different passive pointers used to contact a touch surface so that pointer position data generated in response to a pointer contact with the touch surface can be processed in accordance with the type of pointer used to contact the touch surface. The touch system comprises a touch surface to be contacted by a passive pointer and at least one imaging device having a field of view looking generally across the touch surface. At least one processor communicates with the at least one imaging device and analyzes images acquired by the at least one imaging device to determine the type of pointer used to contact the touch surface and the location on the touch surface where pointer contact is made. The determined type of pointer and the location on the touch surface where the pointer contact is made are used by a computer to control execution of an application program executed by the computer.

United States Patent Publication No. 2011/0242060 to SMART Technologies ULC, the entirety of the specification incorporated by reference, discloses an interactive input system having at least one imaging assembly that captures image frames of a touch region. A pointer placed within the touch region modulates an emitted infrared light using a different combination of subcarrier frequencies that are captured in the image frames. A processing structure demodulates the captured image frames to determine frequency components thereof and examines the frequency components to determine at least one attribute of the pointer.

U.S. Patent Publication No. 2014/0137015 titled "Method and Apparatus for Manipulating Digital Content", the entirety of the specification incorporated by reference, assigned to SMART Technologies ULC discloses an interactive input system having a pen tool whereby removal of the pen tool from the tool tray conditions the Digital Signal Processor (DSP) controller to check if a modulated signal is output by the pen tool. If no modulated signal from the pen tool has been received, the controller simply remains in a ready state awaiting such a modulated signal. When the pen tool is brought into contact with the display surface, the pen tool emits a modulated signal that is received by the wireless unit connected to the DSP. The DSP checks to determine whether a specific attribute has been assigned to the pen tool, for example colour, or whether a default attribute has been assigned to the pen tool. The DSP controller then uses the modulated signal-to-pen tool mode mapping to determine whether the writing end or erasing end of the pen tool has been used to contact the display surface.

U.S. Pat. No. 6,498,590 to Dietz and further described in Dietz et al., "DiamondTouch: A multi-user touch technology," Proc. User Interface Software and Technology (UIST) 2001, pp. 219-226, 2001 discloses a multi-user touch system including a surface on which are a pattern of mounted antennas. A transmitter transmits uniquely identifiable signals to each antenna. Receivers are capacitively coupled to different users and are configured to receive the uniquely identifiable signals. A processor then associates a specific antenna with a particular user when multiple users simultaneously touch any of the antennas. Through identifying particular users, the system has the ability to generate virtual personal work areas. Although the system is designed for group collaboration on a common surface, in practice, individuals may want to "break away" to briefly address some subset of the problem, and then wish to integrate their result into the whole. When these situations arise, the system can generate a virtual personal work area in front of the appropriate user that only responds to that user. The user can then manipulate objects in this space, without impacting the larger work effort of other users but for the loss of some screen space. Because these virtual personal work areas are software defined, they can be generated and destroyed on the fly, in any shape as desired.

The invention described herein may provide: an improved pointer identification method and system for use with a distributed emitter-detector touch system.

SUMMARY OF THE INVENTION

According to at least one aspect of the invention, there is provided an interactive device comprising: a touch area; a plurality of emitters on the periphery of the touch area; the emitters emitting an intensity of light into the touch area; a plurality of pointers having a distinct optical property responsive to the light; at least one detector directed towards the touch area; a processing structure in communication with the emitters and the at least one detector; a tangible computer-readable medium in communication with the processing structure, the medium comprising instructions to configure the processing structure to: transmit an emitter signal to at least one of the emitters initiating emission of light; receive at least one detector signal from the at least one detector; and determine the distinct optical property from the at least one detector signal. The distinct optical property may reduce the light intensity passing therethrough. Each pointer may reduce the light intensity passing therethrough by different amounts. The distinct optical property may be passive. The processing structure may determine the light intensity reduction for a particular pointer based on the received detection signals compared to at least one threshold. The processing structure may determine the light intensity reduction by calculating an incident field, a scattered field, and an internal field of the particular pointer.

According to another aspect of the invention, the distinct optical property may refract the light passing therethrough. Each pointer may refract the light according to a different refraction profile. The processing structure may determine the refraction profile for at least one of the pointers based on the received detection signals. The processing structure may determine the refraction profile from incident waves and scattered waves.

According to yet another aspect of the invention, the distinct optical property may reflect the light at a reflection angle. Each pointer may reflect the light at different angles. The processing structure may determine the reflection angle for at least one of the pointers based on the received detection signals.

According to another aspect of the invention, the distinct optical property comprises a quantum dot material. For each pointer, the quantum dot material may emit a different frequency of light in response to the light from the emitters. The processing structure may determine the frequency of light emitted from the quantum dot material for at least one of the pointers based on the received detection signals. One or more of the detectors may comprise a filter that passes the frequency of light emitted from the quantum dot material.

According to yet another aspect of the invention, each of the plurality of emitters may comprise three light emitting diodes; each of the three light emitting diodes radiates light with peak frequencies of 780 nm, 850 nm, and 940 nm. The plurality of pointers may comprise an eraser, a first pointer, and a second pointer. The eraser may attenuate 850 nm and 940 nm light. The first pointer may attenuate 780 nm light. The second pointer may attenuate 780 nm and 850 nm light.

According to at least one aspect of the invention, there is provided a method of identifying and tracking each of a plurality of pointers in an interactive device comprising: emitting light from emitters according to a pattern; receiving signals from detectors at a processing structure; processing the signals to detect and locate each pointer contacting a touch area; and determining a distinct optical property of each pointer contacting the touch area. The distinct optical property may be passive.

According to another aspect of the invention, the method may determine the light intensity reduction for a particular pointer based on the received detection signals compared to at least one threshold. The method may determine the light intensity reduction by calculating an incident field, a scattered field, and an internal field of the particular pointer. The distinct optical property may reduce the light intensity passing therethrough. Each pointer may reduce the light intensity passing therethrough by different amounts. The distinct optical property refracts the light passing therethrough.

According to yet another aspect of the invention, the method may determine the refraction profile for at least one of the pointers based on the received detection signals. The method may determine the refraction profile from incident waves and scattered waves. Each pointer may refract the light according to a different refraction profile. The distinct optical property may reflect the light at a reflection angle.

According to even yet another aspect of the invention, the method may determine the reflection angle for at least one of the pointers based on the received detection signals. Each pointer may reflect the light at different angles.

According to another aspect of the invention, the method may determine the frequency of light emitted from the quantum dot material for at least one of the pointers based on the received detection signals. The distinct optical property may comprise a quantum dot material. For each pointer, the quantum dot material may emit a different frequency of light than the light of the emitters in response to the light from the emitters.

According to other aspects of the invention, each of the emitters may comprise three light emitting diodes; each of the three light emitting diodes radiates light with peak frequencies of 780 nm, 850 nm, and 940 nm. The plurality of pointers may comprise an eraser, a first pointer, and a second pointer. The eraser may attenuate 850 nm and 940 nm light; the first pointer may attenuate 780 nm light. The second pointer may attenuate 780 nm and 850 nm light.

According to yet another aspect of the invention, there is provided, an interactive device comprising: emitters on the periphery of a touch area; pointers having a distinct optical property responsive to electromagnetic radiation; detectors directed towards the emitters; a processing structure in communication with the emitters and the detectors; a tangible computer-readable medium in communication with the processing structure, the medium comprising instructions to configure the processing structure to: transmit an electrical signal to at least one of the emitters causing emission of electromagnetic radiation; receive detector signals from the detectors; and determine the distinct optical property from the detector signals. The distinct optical property may be passive. The distinct optical property may reduce the light intensity passing therethrough. Each pointer may reduce the light intensity passing therethrough by different amounts. The processing structure may determine the light intensity reduction for a particular pointer based on the received detection signals compared to at least one threshold. The processing structure may determine the light intensity reduction by calculating an incident field, a scattered field, and an internal field of the particular pointer. The distinct optical property may refract the light passing therethrough. Each pointer may refract the light according to a different refraction profile. The processing structure may determine the refraction profile for at least one of the pointers based on the received detection signals. The processing structure may determine the refraction profile from incident waves and scattered waves. The distinct optical property may reflect the light at a reflection angle. Each pointer may reflect the light at different angles. The processing structure may determine the reflection angle for at least one of the pointers based on the received detection signals. The distinct optical property may be located at a tip of the at least one pointer. The distinct optical property may comprise a quantum dot material. For each pointer, the quantum dot material may emit a different frequency of light than the light of the emitters in response to the light from the emitters. The processing structure may determine the frequency of light emitted from the quantum dot material for at least one of the pointers based on the received detection signals. Each of the emitters may comprise three light emitting diodes. Each of the three light emitting diodes may radiate light with peak frequencies of 780 nm, 850 nm, and 940 nm. The pointers may comprise an eraser, a first pointer, and a second pointer. The eraser may attenuate 850 nm and 940 nm light. The first pointer may attenuate 780 nm light. The second pointer may attenuate 780 nm and 850 nm light.

According to any aspect of the invention, the distinct optical property may be located at a tip of the at least one pointer.

According to at least one aspect of the invention, there is provided a plurality of pointers interacting with an interactive device, each pointer comprising: an elongate portion and a tip portion; and the tip portion comprising quantum dots.

BRIEF DESCRIPTION OF THE DRAWINGS

An embodiment will now be described, by way of example only, with reference to the attached Figures, wherein:

FIGS. 2A and 2B show a perspective view of a capture board and control icons respectively;

FIG. 5 demonstrates a processing structure of a mobile device;

DETAILED DESCRIPTION OF THE EMBODIMENT

While the Background of Invention described above has identified particular problems known in the art, the present invention provides, in part, new and useful interactive systems.

Figure 1:
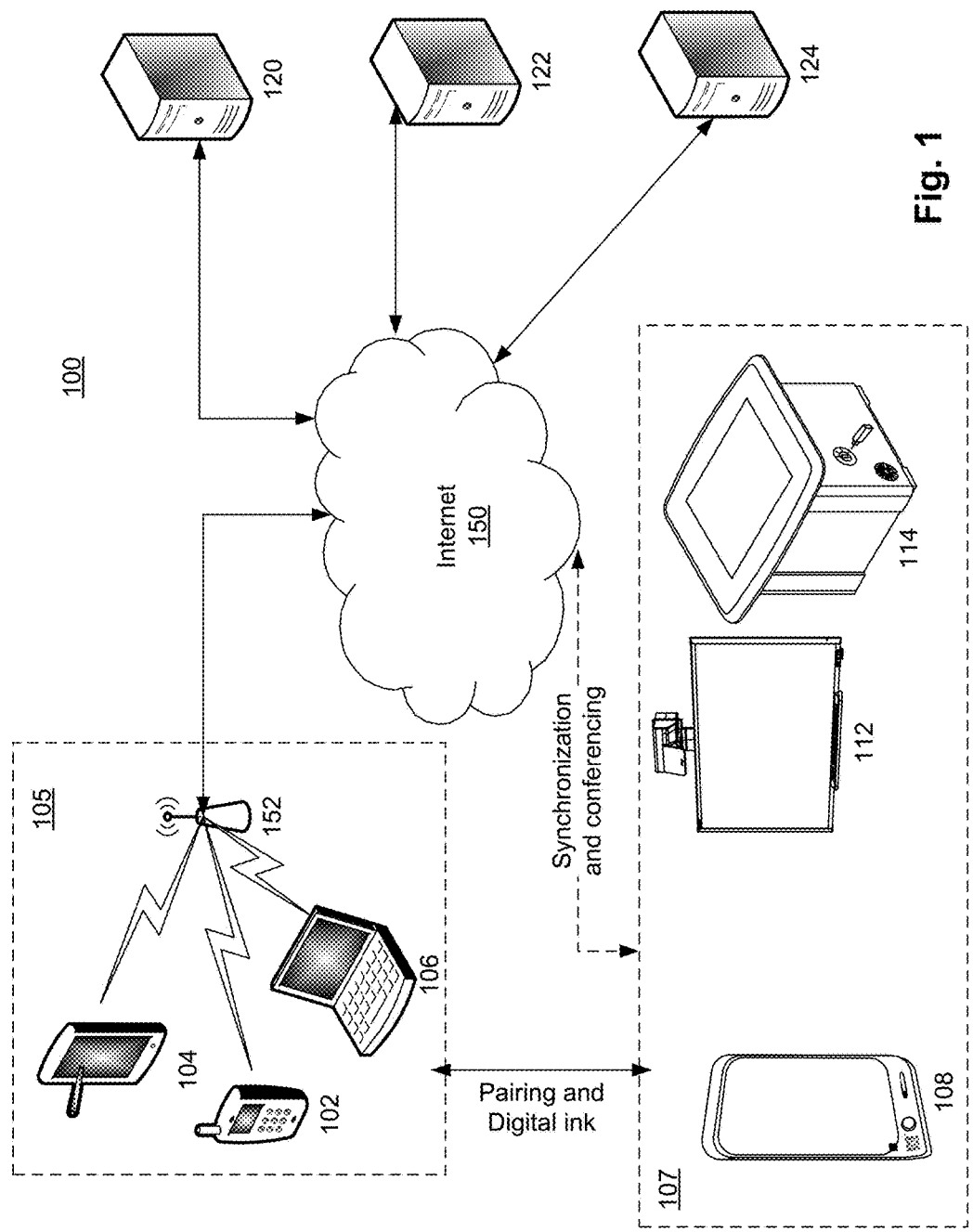
FIG. 1 shows an overview of collaborative devices in communication with one or more portable devices and servers.

FIG. 1 demonstrates a high-level hardware architecture 100 of the present embodiment. A user has a mobile device 105 such as a smartphone 102, a tablet computer 104, or laptop 106 that is in communication with a wireless access point 152 such as 3G, LTE, WiFi, Bluetooth®, near-field communication (NFC) or other proprietary or non-proprietary wireless communication channels known in the art. The wireless access point 152 allows the mobile devices 105 to communicate with other computing devices over the Internet 150. In addition to the mobile devices 105, a plurality of collaborative devices 107 such as a kapp™ capture board 108 produced by SMART Technologies, wherein the User's Guide is herein incorporated by reference, an interactive whiteboard 112, or an interactive table 114 may also connected to the Internet 150. The system comprises an authentication server 120, a profile or session server 122, and a content server 124. The authentication server 120 verifies a user login and password or other type of login such as using encryption keys, one time passwords, etc. The profile server 122 saves information about the user logged into the system. The content server 124 comprises three levels: a persistent back-end database, middleware for logic and synchronization, and a web application server. The mobile devices 105 may be paired with the capture board 108 as will be described in more detail below. The capture board 108 may also provide synchronization and conferencing capabilities over the Internet 150 as will also be further described below.

As shown in FIG. 2A, the capture board 108 comprises a generally rectangular touch area 202 whereupon a user may draw using a dry erase marker or pointer 204 and erase using an eraser 206. The capture board 108 may be in a portrait or landscape configuration and may be a variety of aspect ratios. The capture board 108 may be mounted to a vertical support surface such as for example, a wall surface, window or the like or optionally mounted to a moveable or stationary stand. The touch area 202 comprises a touch sensing technology capable of determining and recording the pointer 204 (or eraser 206) position within the touch area 202. The recording of the path of the pointer 204 (or eraser) permits the capture board to have a digital representation of all annotations stored in memory as described in more detail below.

The capture board 108 comprises at least one of a quick response (QR) code 212 and/or a near-field communication (NFC) area 214 of which may be used to pair the mobile device 105 to the capture board 108. The QR code 212 is a two-dimensional bar code that may be uniquely associated with the capture board 108. In this embodiment, the QR Code 212 comprises a pairing Universal Resource Locator (URL) derived from the Bluetooth address of the board as further described in U.S. Publication Ser. No. 14/712,452, herein incorporated by reference in its entirety.

The NFC area 214 comprises a loop antenna (not shown) that interfaces by electromagnetic induction to a second loop antenna 340 located within the mobile device 105. Near-field communication operates within the globally available and unlicensed radio frequency ISM band of 13.56 MHz on ISO/IEC 18000-3 air interface and at rates ranging from 106 kbit/s to 424 kbit/s. In the present embodiment, the NFC area 214 acts as a passive target for the initiator within the mobile device 105. The initiator actively generates an RF field that can power the passive target. This enables NFC targets 214 to be simple form factors such as tags, stickers, key fobs, or battery-less cards, which are inexpensive to produce and easily replaceable. NFC tags 214 contain data (currently between 96 and 4,096 bytes of memory) and are typically read-only, but may be rewritable. In alternative embodiments, NFC peer-to-peer communication is possible, such as placing the mobile device 105 in a cradle. In this alternative, the mobile device 105 is preferably powered. Similar as for the QR code 212, the NFC tag 214 stores the pairing URL produced in a similar manner as for the QR code 212.

As shown in FIG. 2B, an elongate icon control bar 210 may be present adjacent the bottom of the touch area 202 or on the tool tray 208 and this icon control bar may also incorporate the QR code 212 and/or the NFC area 214. All or a portion of the control icons within the icon control bar 210 may be selectively illuminated (in one or more colours) or otherwise highlighted when activated by user interaction or system state. Alternatively, all or a portion of the icons may be completely hidden from view until placed in an active state. The icon control bar 210 may comprise a capture icon 240, a universal serial bus (USB) device connection icon 242, a Bluetooth/WiFi icon 244, and a system status icon 246 as will be further described below.

Figure 2F:
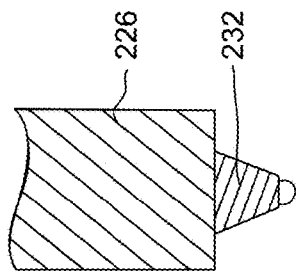
FIGS. 2C to 2F show a pointer having various optical properties for use with the capture board.
Figure 2D:
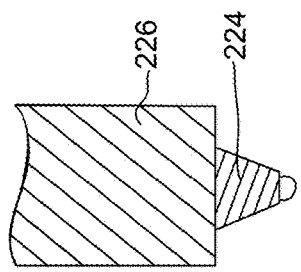
Figure 2E:
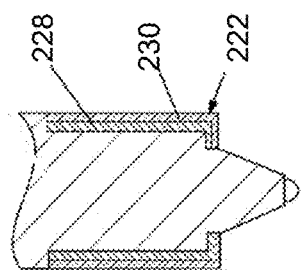
Figure 2C:
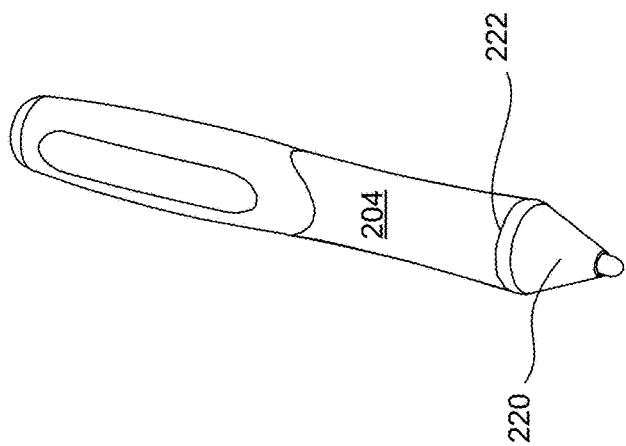

Turning now to FIG. 2C demonstrating an example of a pointer 204 having a tip 220 and an identification feature 222. The pointer 204 may be manufactured through plastic injection molding as is known in the art. In this example, the identification feature 222 is above the tip 220 and encircles the circumference of the pointer 204. In other examples, the identification feature 220 may comprise the entire tip 220 or a portion of the tip 220 of the pointer 204 as further described below with reference to FIGS. 2D to 2F.

In FIG. 2D, the pointer 204 is shown in cross section wherein the identification feature 220 comprises the entire tip 220. The identification feature 220 comprises a transparent medium 224 that may be made of a different material than the main body 226 of the pointer 204. In some embodiments, the entire pointer 204 may be constructed of the same transparent medium 224. The capture board 108 may comprise a plurality of pointers 204 each having an identification feature 220 comprising different transparent mediums or reflective mediums 224 and/or other optical properties as described in further detail with reference to FIGS. 4F to 4J below.

In FIG. 2E, the identification feature 222 comprises a reflective layer 228 covered by an optional transparent film 230. The reflective layer 228 is formed by micromachining the exterior surface of the pointer 204 such that incident light on the reflective layer 228 reflects the light at a specific angle as further described with reference to FIGS. 4G to 4J below. Alternatively, the reflective layer 228 may be applied as a film to the pointer 204. In yet another alternative, the index of refraction of the pointer 204 may be varied within the pointer 204 in order to adjust the angle of the light as it passes through the pointer 204. The optional transparent film 230 may provide a smooth, comfortable surface for the user and/or may filter the incident light prior to being reflected by the reflective layer 228.

In FIG. 2F, the identification feature 222 comprises a quantum dot (QD) material 232 and the remainder of the pointer 204 may comprise a different material 226 such as injected molded plastic. The QD material 232 comprises a plurality of nanocrystals, such as for example PbS, PbSe, InAs or InP, with sizes in the range of between about 2-50 nm as described in Sargent, Edward H. "Infrared Quantum Dots", *Advanced Materials,* 2005, 17, No. 5 and Mićić, O. I. et al. "Size-Dependent Spectroscopy of InP Quantum Dots", *Journal of Physical Chemistry B,* 1997, 101(25), pp. 4904-4912; both of which are herein incorporated by reference in their entirety. The nanocrystals may be embedded within a transparent or translucent plastic material. When light contacts the QD material 232, the light is red-shifted to a lower frequency that corresponds to the size of the nanocrystals present in the material. The smaller-sized nanocrystals produce smaller wavelengths of light whereas larger-sized nanocrystals produce longer wavelengths of light. In the present example, the QD material may emit light in the near-infrared range around 850 nm. In other examples, the QD material may emit light with other frequencies in the near infrared range, far infrared range, or the visible light range. The QD material 232 has been shown as the entire tip 220 of the pointer 204; however, it may be possible to have the QD material 232 be a thin film over a tip 220 made of injection molded plastic or alternatively, the tip 220 may comprise a transparent plastic with the nanocrystals embedded therein.

Figure 3A:
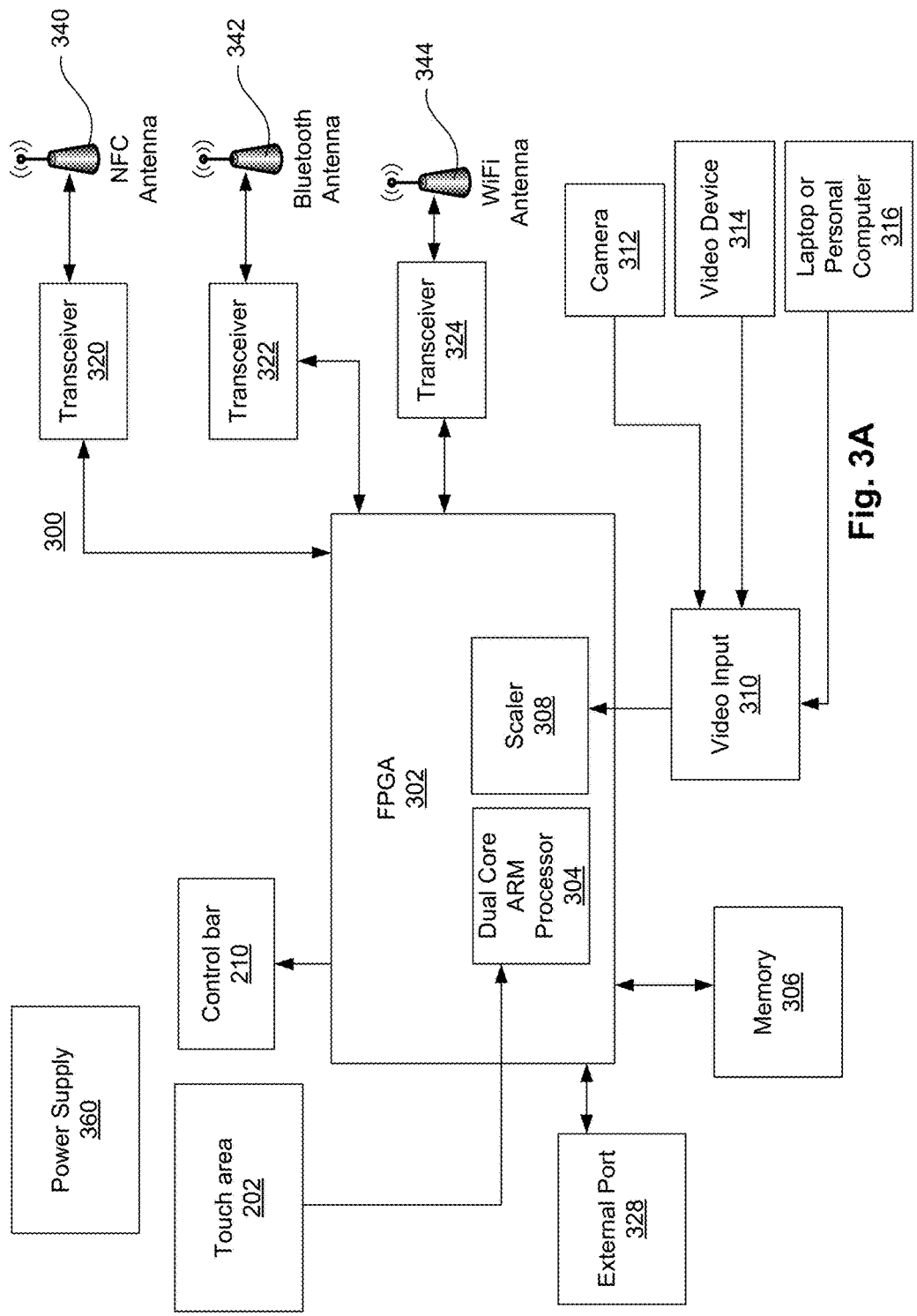
FIGS. 3A to 3C demonstrate a processing architecture of the capture board.
Figure 3B:
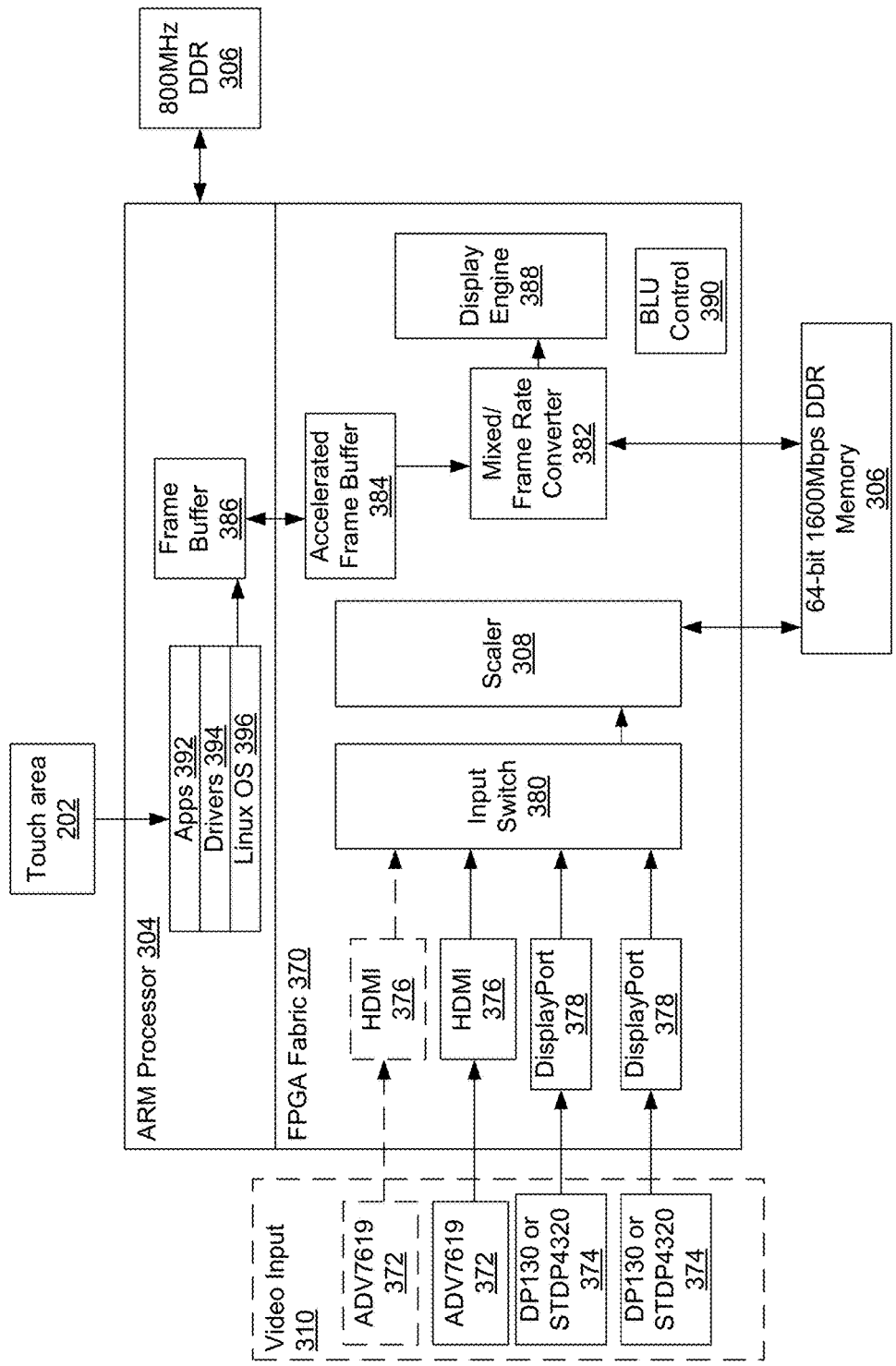
Figure 3C:
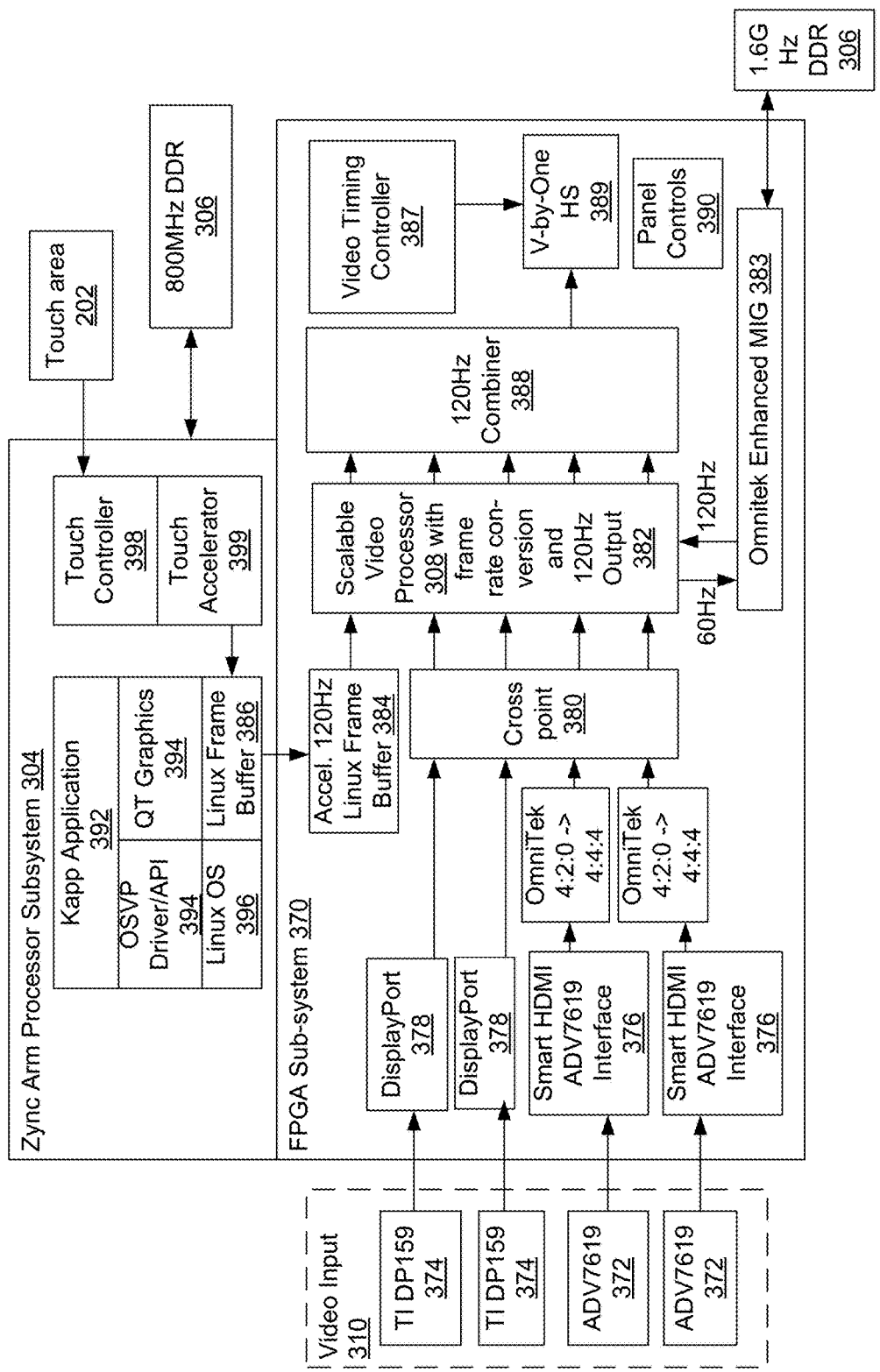

Turning to FIGS. 3A to 3C, the capture board 108 may be controlled with an field programmable gate array (FPGA) 302 or other processing structure which in this embodiment, comprises a dual core ARM Processor 304 executing instructions from volatile or non-volatile memory 306 and storing data thereto. The FPGA 302 may also comprise a scaler 308 which scales video inputs 310. The video input 310 may be from a camera 312, a video device 314 such as a DVD player, Blu Ray player, VCR, etc, or a laptop or personal computer 316. The FPGA 302 communicates with the mobile device 105 (or other devices) using one or more transceivers such as, in this embodiment, an NFC transceiver 320 and antenna 340, a Bluetooth transceiver 322 and antenna 342, or a WiFi transceiver 324 and antenna 344. Optionally, the transceivers and antennas may be incorporated into a single transceiver and antenna. The FPGA 302 may also communicate with an external device 328 such as a USB memory storage device (not shown) where data may be stored thereto. A wired power supply 360 provides power to all the electronic components 300 of the capture board 108. The FPGA 302 interfaces with the previously mentioned icon control bar 210.

When the user contacts the pointer 204 with the touch area 202, the processor 304 tracks the motion of the pointer 204 and stores the pointer contacts in memory 306. Alternatively, the touch points may be stored as motion vectors or Bezier splines. The memory 306 therefore contains a digital representation of the drawn content within the touch area 202. Likewise, when the user contact the eraser 206 with the touch area 202, the processor 304 tracks the motion of the eraser 206 and removes drawn content from the digital representation of the drawn content. In this embodiment, the digital representation of the drawn content is stored in non-volatile memory 306.

When the pointer 204 contacts the touch area 202 in the location of the capture (or snapshot) icon 240, the FPGA 302 detects this contact as a control function which initiates the processor 304 to copy the currently stored digital representation of the drawn content to another location in memory 306 as a new page also known as a snapshot. The capture icon 240 may optionally flash during the saving of the digital representation of drawn content to another memory location. The FPGA 302 then initiates a snapshot message to one or more of the paired mobile device(s) 105 via the appropriately paired transceiver(s) 320, 322, and/or 324. The message contains an indication to the paired mobile device(s) 105 to capture the current image as a new page. Optionally, the message may also contain any changes that were made to the page after the last update sent to the mobile device(s) 105. The user may then continue to annotate or add content objects within the touch area 202. Optionally, once the transfer of the page to the paired mobile device 105 is complete, the page may be deleted from memory 306.

If a USB memory device (not shown) is connected to the external port 328, the FPGA 302 illuminates the USB device connection icon 242 in order to indicate to the user that the USB memory device is available to save the captured pages. When the user contacts the capture icon 240 with the pointer 204 and the USB memory device is present, the captured pages are transferred to the USB memory device as well as being transferred to any paired mobile device 105. The captured pages may be converted into another file format such as PDF, Evernote, XML, Microsoft Word®, Microsoft® Visio, Microsoft® Powerpoint, etc and if the file has previously been saved on the USB memory device, then the pages since the last save may be appended to the previously saved file. During a save to the USB memory, the USB device connection icon 242 may flash to indicate a save is in progress.

If the user contacts the USB device connection icon 242 using the pointer 204 and the USB memory device is present, the FPGA 302 flushes any data caches to the USB memory device and disconnects the USB memory device in the conventional manner. If an error is encountered with the USB memory device, the FPGA 302 may cause the USB device connection icon 242 to flash red. Possible errors may be the USB memory device being formatted in an incompatible format, communication error, or other type of hardware failure.

When one or more mobile devices 105 begins pairing with the capture board 108, the FPGA 302 causes the Bluetooth icon 244 to flash. Following connection, the FPGA 302 causes the Bluetooth icon 244 to remain active. When the pointer 204 contacts the Bluetooth icon 244, the FPGA 302 may disconnect all the paired mobile devices 105 or may disconnect the last connected mobile device 105. When the mobile device 105 is disconnecting from the capture board 108, the Bluetooth icon 244 may flash red in colour. If all mobile devices 105 are disconnected, the Bluetooth icon 244 may be solid red or may not be illuminated.

When the FPGA 302 is powered and the capture board 108 is working properly, the FPGA 302 causes the system status icon 246 to become illuminated. If the FPGA 302 determines that one of the subsystems of the capture board 108 is not operational or is reporting an error, the FPGA 302 causes the system status icon 246 to flash. When the capture board 108 is not receiving power, all of the icons in the control bar 210 are not illuminated.

FIGS. 3B and 3C demonstrate examples of structures and interfaces of the FPGA 302. As previously mentioned, the FPGA 302 has an ARM Processor 304 embedded within it. The FPGA 302 also implements an FPGA Fabric or Sub-System 370 which, in this embodiment comprises mainly video scaling and processing. The video input 310 comprises receiving either High-Definition Multimedia Interface (HDMI) or DisplayPort, developed by the Video Electronics Standards Association (VESA), via one or more Xpressview 3 GHz HDMI receivers (ADV7619) 372 produced by Analog Devices, the Data Sheet and User Guide herein incorporated by reference, or one or more DisplayPort Re-driver (DP130 or DP159) 374 produced by Texas Instruments, the Data Sheet, Application Notes, User Guides, and Selection and Solution Guides herein incorporated by reference. These HDMI receivers 372 and DisplayPort re-drivers 374 interface with the FPGA 302 using corresponding circuitry implementing Smart HDMI Interfaces 376 and DisplayPort Interfaces 378 respectively. An input switch 380 detects and automatically selects the currently active video input. The input switch or crosspoint 380 passes the video signal to the scaler 308 which resizes the video. Once the video is scaled, it is stored in memory 306 where it is retrieved by the mixed/frame rate converter 382.

The ARM Processor 304 has applications or services 392 executing thereon which interface with drivers 394 and the Linux Operating System 396. The Linux Operating System 396, drivers 394, and services 392 may initialize wireless stack libraries. For example, the protocols of the Bluetooth Standard, the Adopted Bluetooth Core Specification v 4.2 Master Table of Contents & Compliance Requirements herein incorporated by reference, may be initiated such as a radio frequency communication (RFCOMM) server, configure Service Discovery Protocol (SDP) records, configure a Generic Attribute Profile (GATT) server, manage network connections, reorder packets, transmit acknowledgements, in addition to the other functions described herein. The applications 392 alter the frame buffer 386 based on annotations entered by the user within the touch area 202.

A mixed/frame rate converter 382 overlays content generated by the Frame Buffer 386 and Accelerated Frame Buffer 384. The Frame Buffer 386 receives annotations and/or content objects from the touch controller 398. The Frame Buffer 386 transfers the annotation (or content object) data to be combined with the existing data in the Accelerated Frame Buffer 384. The converted video is then passed from the frame rate converter 382 to the display engine 388.

In FIG. 3C, a OmniTek Scalable Video Processing Suite, produced by OmniTek of the United Kingdom, the OSVP 2.0 Suite User Guide June 2014 herein incorporated by reference, is implemented. The scaler 308 and frame rate converter 382 are combined into a single processing block where each of the video inputs are processed independently and then combined using a 120 Hz Combiner 388. The scaler 308 may perform at least one of the following on the video: chroma upsampling, colour correction, deinterlacing, noise reduction, cropping, resizing, and/or any combination thereof. An additional feature of the embodiment shown in FIG. 3C is an enhanced Memory Interface Generator (MIG) 383 which optimizes memory bandwidth with the FPGA 302. The touch area 202 provides either transmittance coefficients to a touch controller 398 or may optionally provide raw electrical signals or images. The touch controller 398 then processes the transmittance coefficients to determine touch locations as further described below with reference to FIGS. 4A to 4E. The touch accelerator 399 determines which pointer 204 is annotating or adding content objects and injects the annotations or content objects directly into the Linux Frame buffer 386 using the appropriate ink attributes.

The FPGA 302 may also contain backlight control unit (BLU) or panel control circuitry 390 which controls the backlight 480.

The touch area 202 of the embodiment of the invention is observed with reference to FIGS. 4A to 4E and further disclosed in U.S. Pat. No. 8,723,840 to Rapt Touch, Inc. and Rapt IP Ltd., the contents thereof incorporated by reference in their entirety. The FPGA 302 interfaces and controls the touch system 404 comprising emitter/detector drive circuits 402 and a touch-sensitive surface assembly 406. As previously mentioned, the touch area 202 is the surface on which touch events are to be detected. The surface assembly 406 includes emitters 408 and detectors 410 arranged around the periphery of the touch area 202. The detector 410 in the present embodiment operates in a manner similar to a scanning synthetic aperture radar (SAR). In this example, there are K detectors identified as D1 to DK and J emitters identified as Ea to Ej. The emitter/detector drive circuits 402 provide an interface between the FPGA 302 whereby the FPGA 302 is able to independently control and power the emitters 408 and detectors 410. The emitters 408 produce a fan of illumination generally in the infrared (IR) band whereby the light produced by one emitter 408 may be received by more than one detector 410. A "ray of light" refers to the light path from one emitter to one detector irrespective of the fan of illumination being received at other detectors. The ray from emitter Ej to detector Dk is referred to as ray jk. In the present example, rays a1, a2, a3, e1 and eK are examples.

When the pointer 204 contact the touch area 202, the fan of light produced by the emitter(s) 408 is disturbed thus changing the intensity of the ray of light received at each of the detectors 410. The FPGA 302 calculates a transmission coefficient Tjk for each ray in order to determine the location and times of contacts with the touch area 202. The transmission coefficient Tjk is the transmittance of the ray from the emitter j to the detector k in comparison to a baseline transmittance for the ray. The baseline transmittance for the ray is the transmittance measured when there is no pointer 204 interacting with the touch area 202. The baseline transmittance may be based on the average of previously recorded transmittance measurements or may be a threshold of transmittance measurements determined during a calibration phase. Other measures may also be used in place of transmittance such as absorption, attenuation, reflection, scattering, or intensity.

The FPGA 302 then processes the transmittance coefficients Tjk from a plurality of rays and determines touch regions corresponding to one or more pointers 204. Optionally, the FPGA 302 may also calculate one or more physical attributes such as contact pressure, pressure gradients, spatial pressure distributions, pointer type, pointer size, pointer shape, determination of glyph or icon or other identifiable pattern on pointer, etc.

Figure 4A:
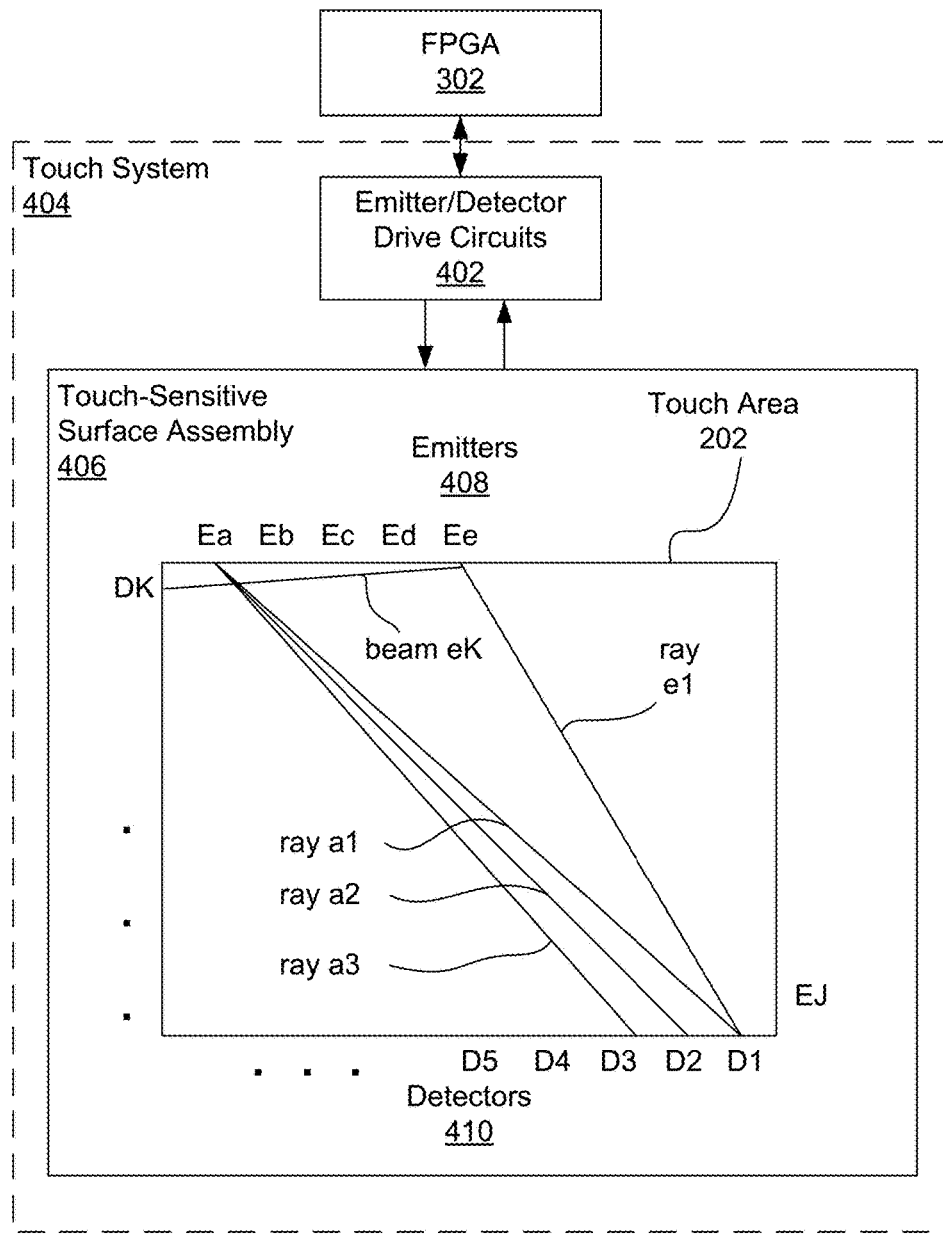
FIG. 4A to 4E show a touch detection system of the capture board.
Figure 4B:
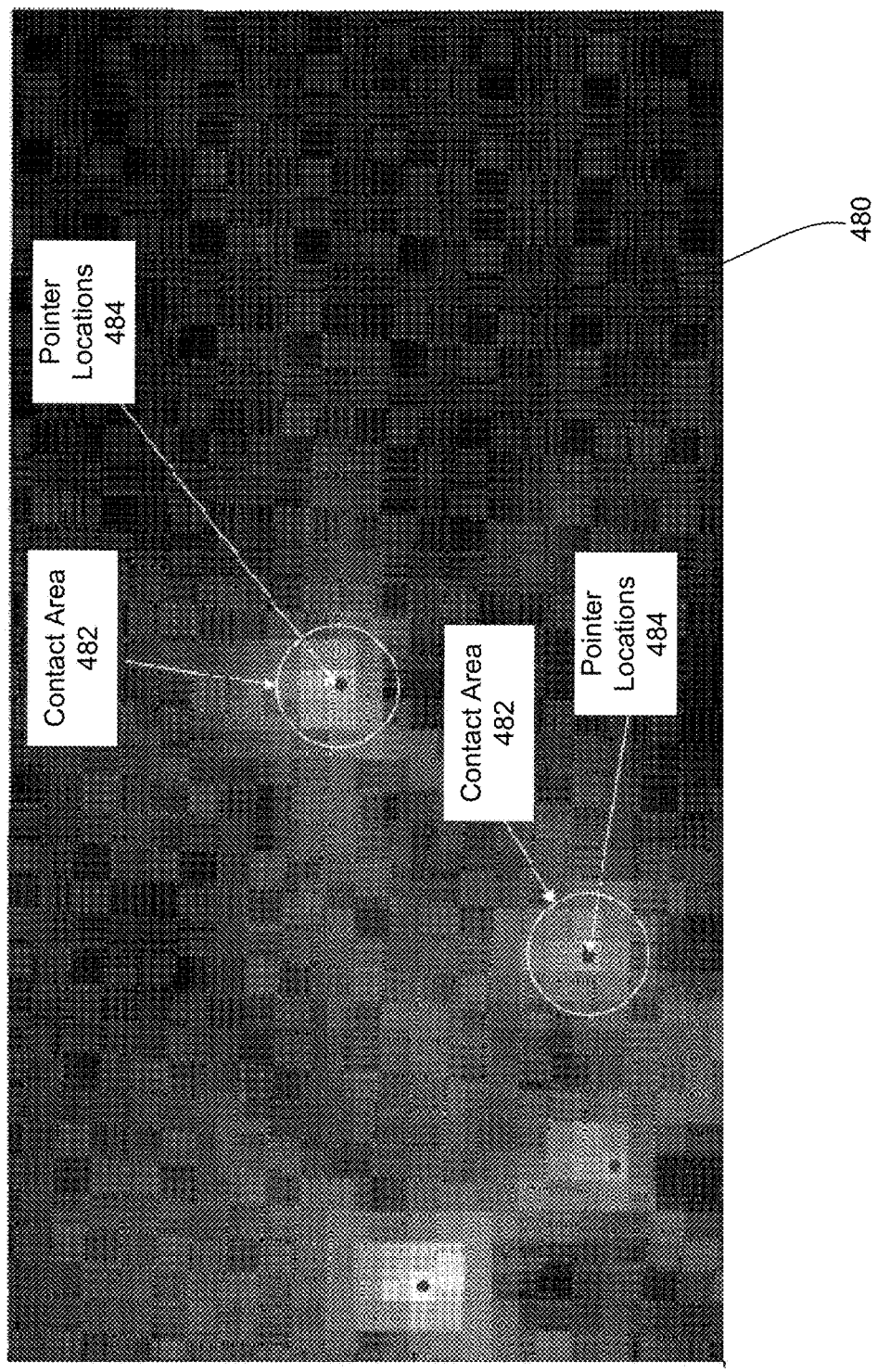

Based on the transmittance coefficients Tjk for each of the rays, a transmittance map is generated by the FPGA 302 such as shown in FIG. 4B. The transmittance map 480 is a grayscale image whereby each pixel in the grayscale image represents a different "binding value" and in this embodiment each pixel has a width and breadth of 2.5 mm. Contact areas 482 are represented as white areas and non-contact areas are represented as dark gray or black areas. The contact areas 482 are determined using various machine vision techniques such as, for example, pattern recognition, filtering, or peak finding. The pointer locations 484 are determined using a method such as peak finding where one or more maxima are detected in the 2D transmittance map within the contact areas 482. Methods for determining these contact locations 484 are disclosed in U.S. Patent Publication No. 2014/0152624, herein incorporated by reference.

Figure 4C:
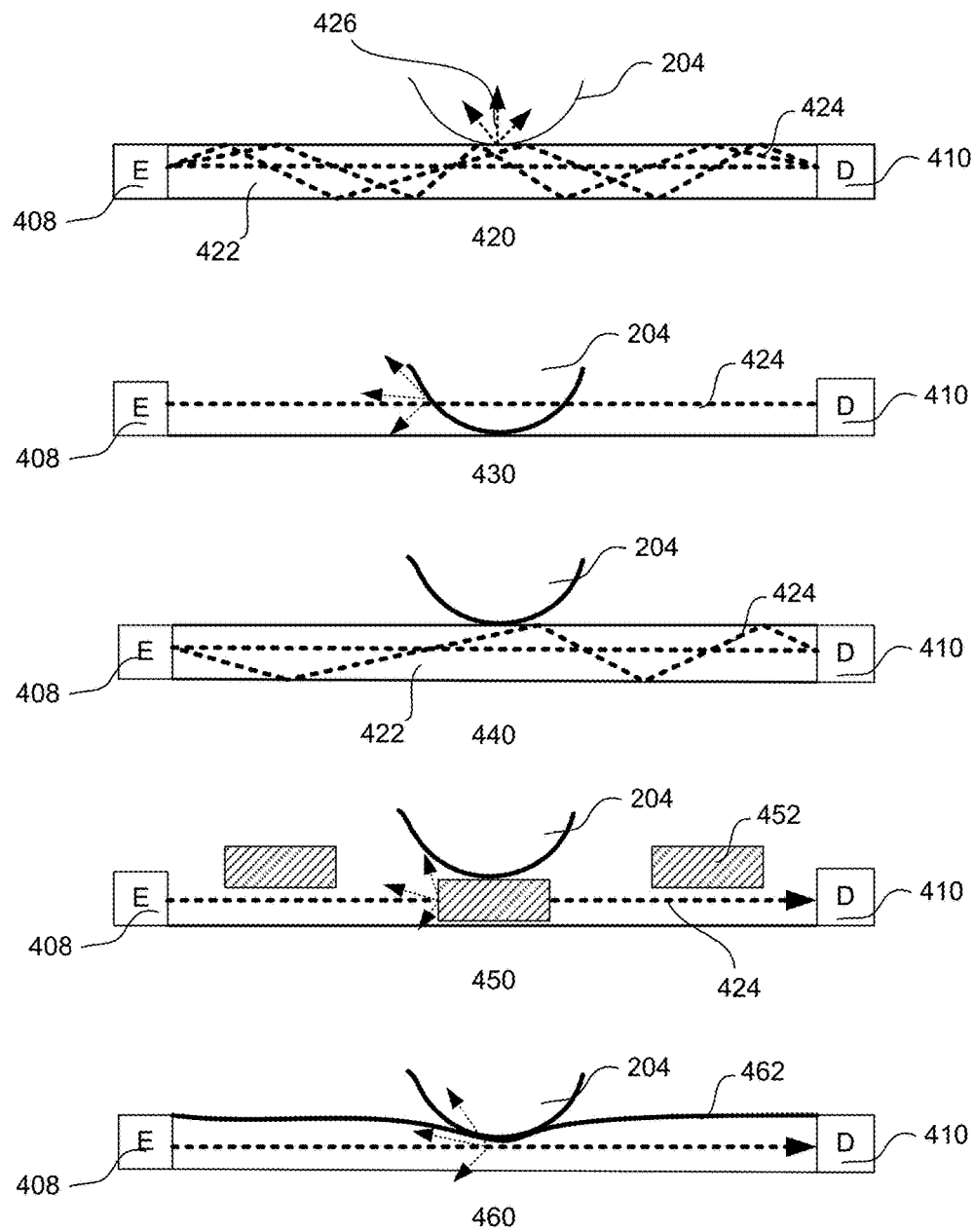
Figure 4D:
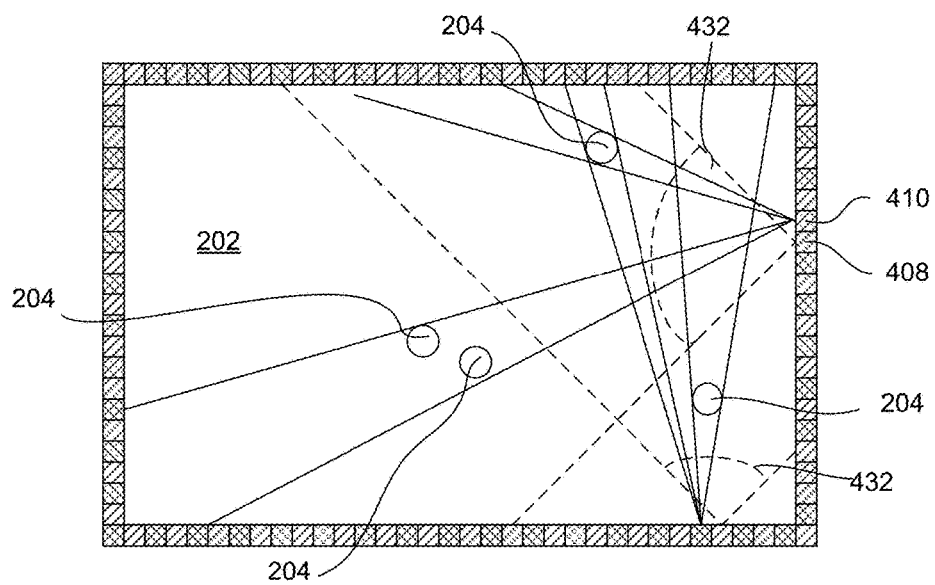

Five example configurations for the touch area 202 are presented in FIG. 4C. Configurations 420 to 440 are configurations whereby the pointer 204 interacts directly with the illumination being generated by the emitters 408. Configurations 450 and 460 are configurations whereby the pointer 204 interacts with an intermediate structure in order to influence the emitted light rays.

A frustrated total internal reflection (FTIR) configuration 420 has the emitters 408 and detectors 410 optically mated to an optically transparent waveguide 422 made of glass or plastic. The light rays 424 enter the waveguide 422 and are confined to the waveguide 422 by total internal reflection (TIR). The pointer 204 having a higher refractive index than air comes into contact with the waveguide 422. The increase in the refractive index at the contact area 482 causes the light to leak 426 from the waveguide 422. The light loss attenuates rays 424 passing through the contact area 482 resulting in less light intensity received at the detectors 410.

An over-the-surface configuration 430 in FIG. 4C, further shown in more detail with respect to FIGS. 4D and 4F to 4J, has emitters 408 providing illumination over the touch area 202 to be received at detectors 410 receiving illumination passing over the touch area 202. The emitter(s) 408 has an illumination field 432 of approximately 90-degrees that illuminates a plurality of pointers 204. Each of the pointers 204 may have a distinct optical property that enables identification of each of the pointers 204. The distinct optical property may be a passive property of the material forming part of the pointer 204. As such, a power source may not be required in the pointer in order to exhibit these optical properties. The pointer 204 enters the area above the touch area 202 whereby it partially or entirely blocks the rays 424 passing through the contact area 482. The detectors 410 similarly have an approximately 90-degree field of view and receive illumination either from the emitters 408 opposite thereto or receive reflected illumination from the pointers 204 in the case of a reflective or retro-reflective pointer 204. The emitters 408 are illuminated one at a time or a few at a time and measurements are taken at each of the receivers to generate a similar transmittance map as shown in FIG. 4B.

Figure 4E:
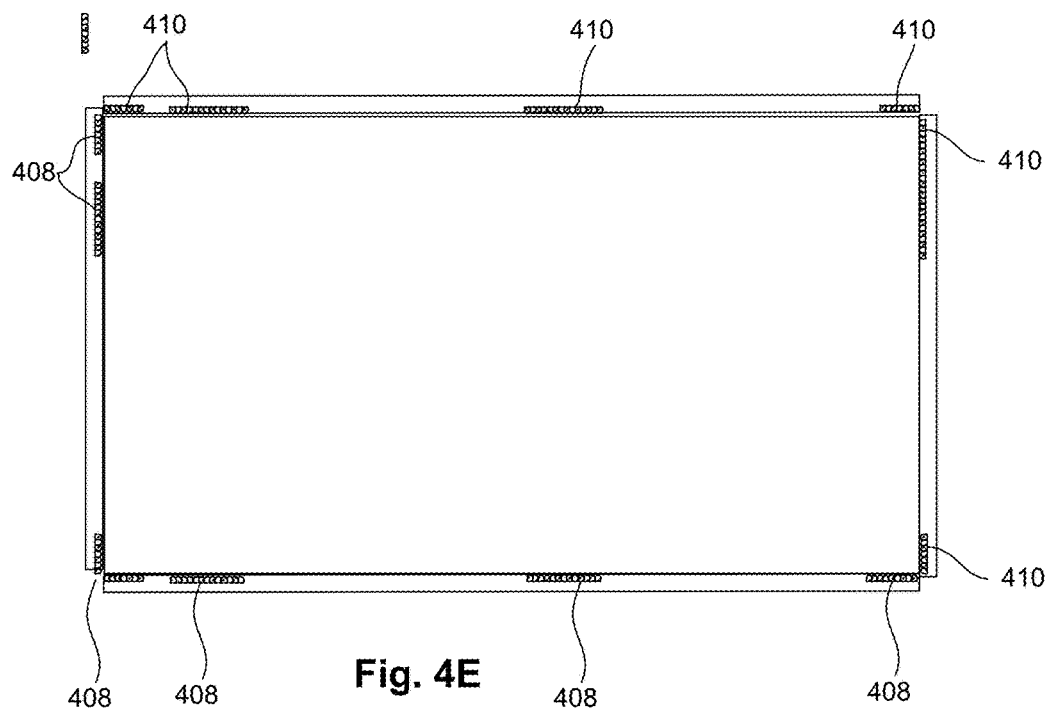
Figure 4F:
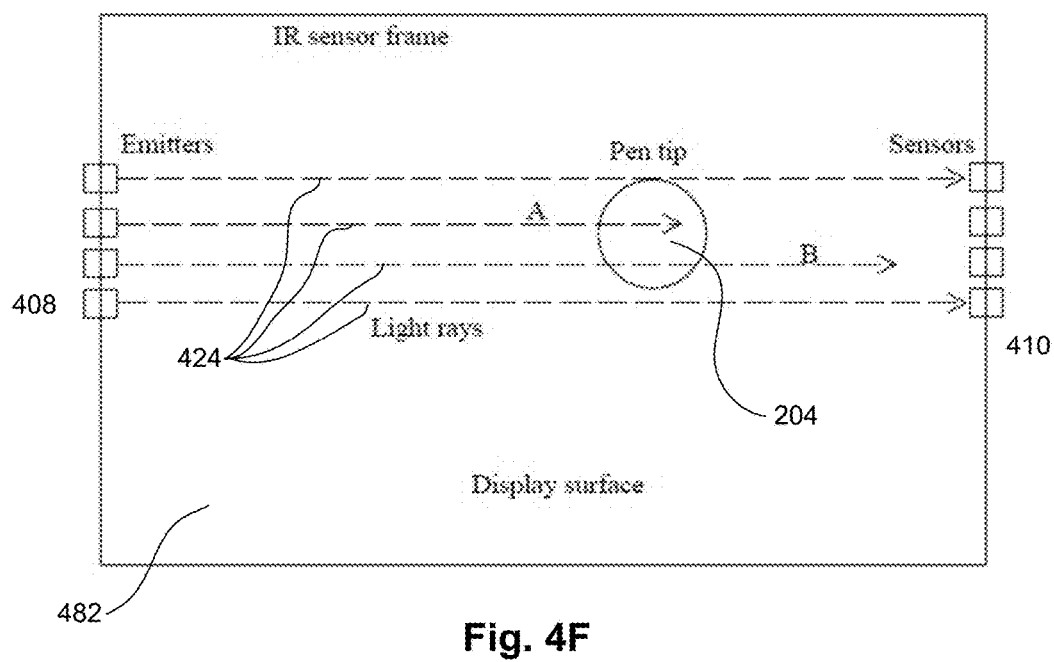
FIG. 4F shows a transparent pointer during use by the touch detection system of the capture board.

As shown in FIG. 4F, when the pointer 204 is transparent or partially transparent, the pointer 204 does not completely block the rays 424 passing through the contact area 482. In particular, dependent on the optical properties of the pointer 204, the pointer 204 may absorb particular wavelengths of light at different efficiencies. In some embodiments, the emitters 408 may emit a number of different peak wavelengths of light such as 780 nm, 850 nm, and/or 940 nm. The emitters 408 may comprise a triplet of LEDs where the distance between the LEDs may be negligible compared to the distance between the triplet and the detectors 410. The FPGA controller 302 may turn on each LED in a triplet for a short duration of time, one by one, and the voltage at the detectors 410 may be measured.

The semi-transparent pointer 204 made of dielectric material interrupts the electromagnetic plane wave emitted by each emitter 408. This reduces to the solution of the Helmholtz equation in cylindrical coordinates (r, θ), and it has an analytical solution in terms of Bessel and Hankel functions. The formulation of Borghi (Borghi, R., Santarsiero, M., Frezza, F., Schettini, G., 1997. "Plane-wave scattering by a dielectric circular cylinder parallel to a general reflecting surface". *J. Opt. Soc. Am. A*, Vol. 14, No. 7, 1500-1504., herein incorporated by reference in its entirety), is used to compute the scattered field. The pointer 204 is assumed to have a radius of α and a refractive index n, and the surrounding medium has a refractive index of 1. The field V(x,z) corresponds to either the electric (TM) or magnetic (TE) field component in the same direction as the axis of the pointer 204. If the amplitude of the incident field is $V_0$, then the incident field may be written as (Harrington, R. F., 1966. *Time-Harmonic Electromagnetic Fields*. McGraw-Hill, New York., herein incorporated by reference in its entirety):

$$V_i = V_0 \cdot \exp(-i \cdot k \cdot r \cdot \cos(\theta)) = V_0 \cdot \sum_{m=-\infty}^{\infty} i^m \cdot J_m(k \cdot r) \cdot \exp(i \cdot m \cdot \theta)$$

where $J_m(k \cdot r)$ is a Bessel function of the first kind of order m. The plane wave has a wavelength λ and hence a wavenumber $k = 2\pi/\lambda$. The scattered field is given by:

$$V_d = V_0 \cdot \sum_{m=-\infty}^{\infty} i^m \cdot d_m \cdot J_m(k \cdot r) \cdot \exp(i \cdot m \cdot \theta)$$

The internal field inside the pointer 204 (e.g. a cylinder) is:

$$V_c = V_0 \cdot \sum_{m=-\infty}^{\infty} i^m \cdot d_m \cdot J_m(k \cdot r) \cdot \exp(i \cdot m \cdot \theta)$$

where in this case, r≤α and the coefficients $d_m$ are $$d_m = \frac{J_m(k \cdot a) \cdot H'_m(k \cdot a) - J'_m(k \cdot a) \cdot H_m(k \cdot a)}{J_m(n \cdot k \cdot a) \cdot H'_m(k \cdot a) - p \cdot J'_m(n \cdot k \cdot a) \cdot H_m(k \cdot a)}$$

where p–n for the TM case, and p–n$^{-1}$ for the TE case and the prime (') means the differentiation of the function with respect to it argument such as:

$$J'_m(x) = \frac{\partial}{\partial x} J_m(x).$$

The emitters 408 may output a spectrum of light (near-infrared, far-infrared, or visible) where the intensity of the light in this spectrum is reduced by the material of the pointer 204. For example, a set of pointers 204 may each be constructed of a material that reduces the intensity of the light in a particular frequency band of infrared (IR) light such as within the near infrared range, such as a pointer that blocks 780 nm whereas permits 850 and 940 nm to pass through. In FIG. 4F, ray A has an intensity that is completely blocked by the pointer 204. Conversely, ray B has an intensity that is able to partially pass through the pointer 204. The detectors 410 are sensitive to the spectrum of light and are used to identify if a pointer 204 is present in the touch area 202 and to determine the position of the pointer 204 based on the transmittance map as previously described. The detectors 410 are able to determine the type of pointer 204 based on the intensity reduction caused by the material of the pointer 204. For example, a first pointer 204 may reduce the light intensity passing therethrough by 20%, a second pointer 204 may reduce the light intensity passing therethrough by 40% and a third pointer 204 may reduce the light intensity passing therethrough by 60%. Using thresholds at the detectors 410, the processing structure 300 may determine the type of pointer 204 based on these known thresholds.

In one example embodiment, the touch area 202 may be configured to operate with an eraser, a red pointer (e.g. first pointer), a black pointer (e.g. second pointer), and a finger. The emitters 408 may transmit peak wavelengths of light at 780 nm, 850 nm, and/or 940 nm. The eraser may comprise filters that permit 780 nm to pass through and block the other wavelengths. The red pointer may permit 850 nm and 940 nm to pass through but block 780 nm. The black pointer may permit 940 nm to pass through but black both 780 and 850 nm. The light received by the detectors 410 are then able to uniquely identify which one of the eraser, red pointer, and black pointer are used. Generally, the finger blocks much of the light received at the detectors 410 for all wavelengths. The voltage measured from the detectors 410 for these filtered wavelengths is higher than a threshold for a finger enabling consistent finger detection. For example, the minimum voltage of the detector 410 for an eraser may be 0.3 V higher than that of the voltage of the detector 410 for a finger. Calibration may be used to determine a suitable threshold to differentiate between finger, eraser, and red or black pointers. The red and black pointers may produce red and black virtual inks in some embodiments. In some embodiments, the pointers may be different colours.

Figure 4G:
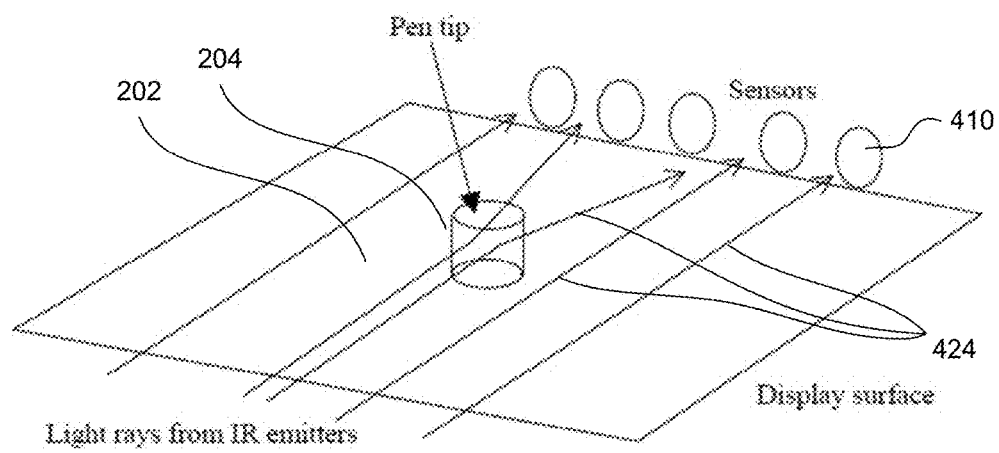
FIGS. 4G to 4J demonstrate a pointer having reflective and refractive characteristics during use by the touch detection system of the capture board.
Figure 4H:
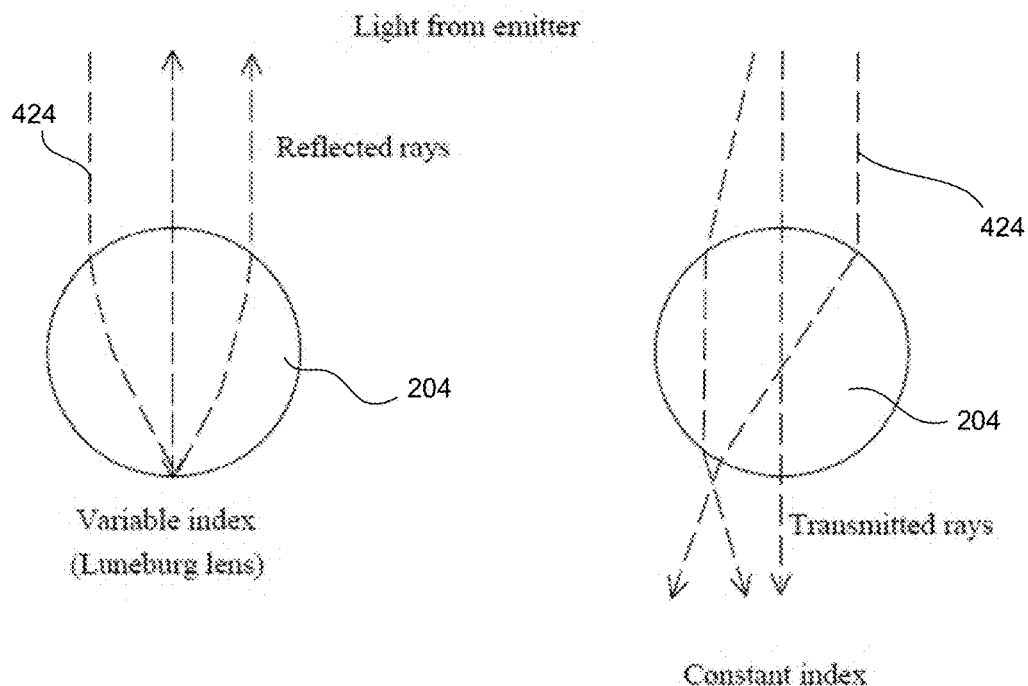

As shown in FIG. 4G, the generally cylindrical pointer 204 enters the touch area 202 where the rays 424 pass through the transparent or semi-transparent material having an index of refraction. The generally cylindrical pointer 204 acts as a cylindrical lens and depending on how a particular ray approaches the pointer 204, it is refracted at different angles. Each different type of pointer 204 may have a different refraction angle at which the light passing therethrough corresponds to the unique identifier of the pointer 204. Alternatively, each different type of pointer 204 may refract the light according to a different refractive or refraction profile (e.g. different type of lensing). For example, there may be four pointers with 5-degree, 30-degree, 60-degree, and 90-degree angle although other angles may be used. The net effect of this refraction is a loss of light received at the detectors 410 assuming that the pointer 204 has a constant index of refraction (as shown in FIG. 4H). If the index of refraction of the pointer 204 increases inwards (e.g. towards the cylinder's axis), the pointer 204 acts similar to a Luneburg lens (from Luneburg, R. K. *Mathematical Theory of Optics*. Brown University. 1944, herein incorporated by reference in its entirety), which would reflect light directly back to the emitter. The pointer 204 then appears to the detector 410 as a dark object as shown in FIG. 4J but may be received by a detector 410 located proximate to the emitter 408. If this situation were observed by the processing structure 300, then it would indicate unambiguously the presence of the pointer 204 on the display.

Different pointers 204 may have different refraction profiles in order for the pointer 204 to be identified. Ray tracing may be used by the processing structure 300 in order to identify the type of pointer 204 based on the optical properties of the pointer 204 such as refraction angle. Although refraction angle is used herein to determine the pointer identifier, other embodiments may have the pointer 204 reflectors that reflect the light at a reflection angle.

Figure 4I:
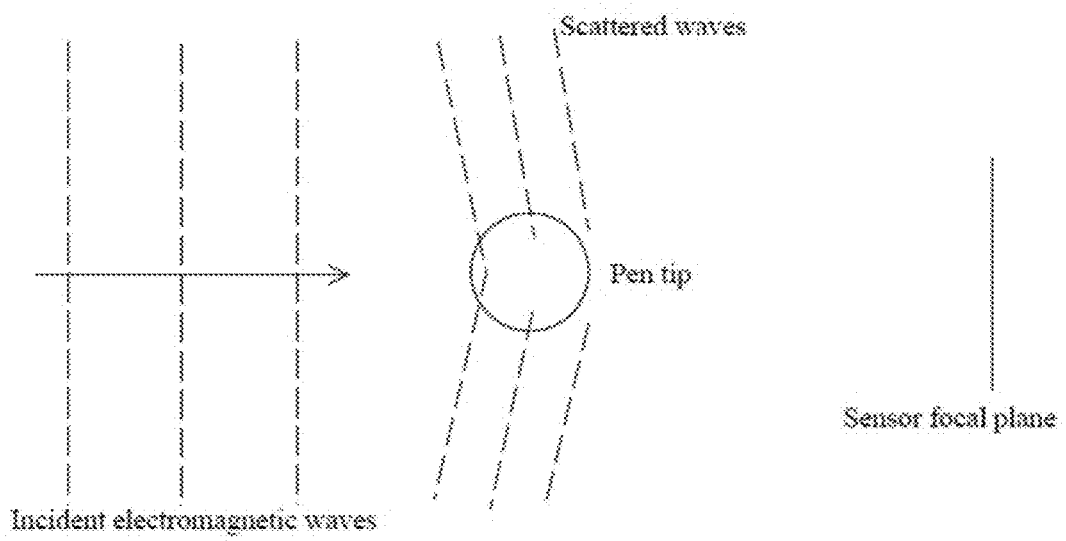
Figure 4J:
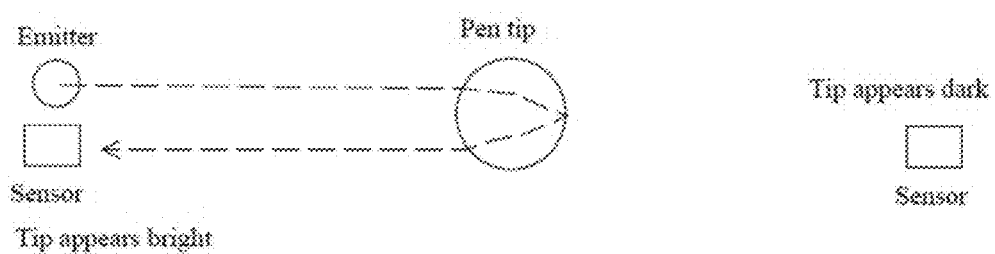

In another example, the pointer 204 scatters the rays 424 as demonstrated in FIG. 4I, which is particularly applicable to small-sized pointers 204. The incident electromagnetic waves intersect with the pointer 204 and partially penetrate the semi-transparent pointer 204 and scatter off the exterior. Mathematically, the problem is defined by the Helmholtz partial differential equation in three dimensions, an incident and scattered field, and the Sommerfeld radiation boundary condition, which says in effect that all scattered waves must be outgoing ones (e.g., moving away from the pen tip). Formally, the problem is defined by (from, for example, Colton, D., Kress, R., 2013. *Inverse Acoustic and Electromagnetic Scattering Theory*. Third edition. Springer., herein incorporated by reference in its entirety):

$$\nabla^2 u + k^2 \cdot n(r) \cdot u = 0$$

$$u(r) = u_i + u_s$$

where $u_i$ and $u_s$ are the incident and scattered waves, respectively, and n(r) is the index of refraction as a function of position in space. $\nabla^2$ is the Laplacian operator in either two or three dimensions given by:

$$\nabla^2 f = \frac{\partial^2}{\partial x^2} f + \frac{\partial^2}{\partial y^2} f + \frac{\partial^2}{\partial z^2} f$$

where f=f (x, y, z). The two-dimensional version results if z is removed from the equations. As before, k is the wavenumber of the light as previously defined. r represents the three-dimensional position in space (e.g. r=(x, y, z). The solution is formally given in terms of the free-space Green's function G(r) as a convolution integral:

$$u_s = \int G(r-r') \cdot V \cdot u \, dr'$$

where the term V contains the index of refraction n(r) and may be simplified using the Born approximation (setting $u = u_i$) to give $$u_s = \int G(r-r') \cdot V \cdot u_i \, dr'$$

where specifying the incident wave and index of refraction allows the scattered electromagnetic field from the pointer 204 to be computed. r' is an integration variable, and is also the three-dimensional position in space as defined above. The amplitude of this scattered field corresponds to the signal detected at a particular detector 410.

Another total internal reflection (TIR) configuration 440 is based on propagation angle. The ray is guided in the waveguide 422 via TIR where the ray hits the waveguide-air interface at a certain angle and is reflected back at the same angle. Pointer 204 contact with the waveguide 422 steepens the propagation angle for rays passing through the contact area 482. The detector 410 receives a response that varies as a function of the angle of propagation.

The configuration 450 show an example of using an intermediate structure 452 to block or attenuate the light passing through the contact area 482. When the pointer 204 contacts the intermediate structure 452, the intermediate structure 452 moves into the touch area 202 causing the structure 452 to partially or entirely block the rays passing through the contact area 482. In another alternative, the pointer 204 may pull the intermediate structure 452 by way of magnetic force towards the pointer 204 causing the light to be blocked.

In another configuration 460, the intermediate structure 452 may be a continuous structure 462 rather than the discrete structure 452 shown for configuration 450. The intermediate structure 452 is a compressible sheet 462 that when contacted by the pointer 204 causes the sheet 462 to deform into the path of the light. Any rays 424 passing through the contact area 482 are attenuated based on the optical attributes of the sheet 462. Other alternative configurations for the touch system are described in U.S. Patent Publication No. 2015/0029165 and U.S. Patent Publication No. 2015/0277586, both of which are herein incorporated by reference in their entirety.

With reference to FIG. 4E, the emitters 408 and detectors 410 are located in banks around the periphery of the touch area 202. To determine the pointer 204 location, successive pulses of light from the emitters 408 are transmitted to illuminate the touch area 202, and the echo of each pulse is received and recorded by the detectors 410. Signal processing of the recorded echoes allows it then to combine the recordings from the multiple detector 410 locations and allows it to create finer resolution image of the position of the pointer 204.

Figure 4K:
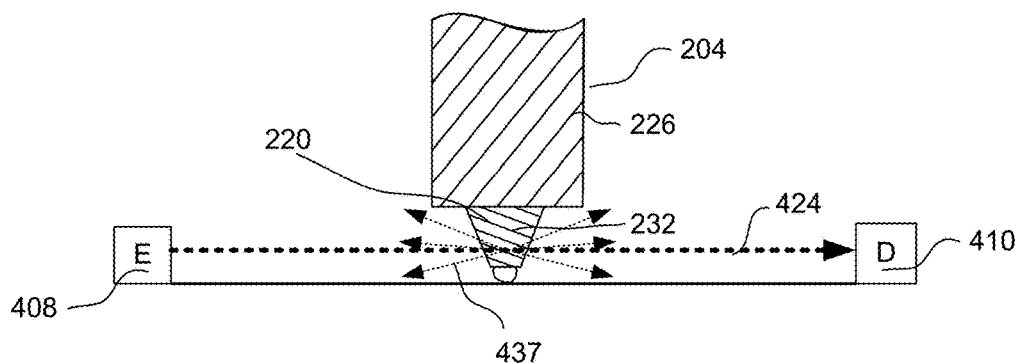
FIGS. 4K and 4L show a pointer having at least one quantum dot therein during use by the touch detection system of the capture board or a curved capture board.
Figure 4L:
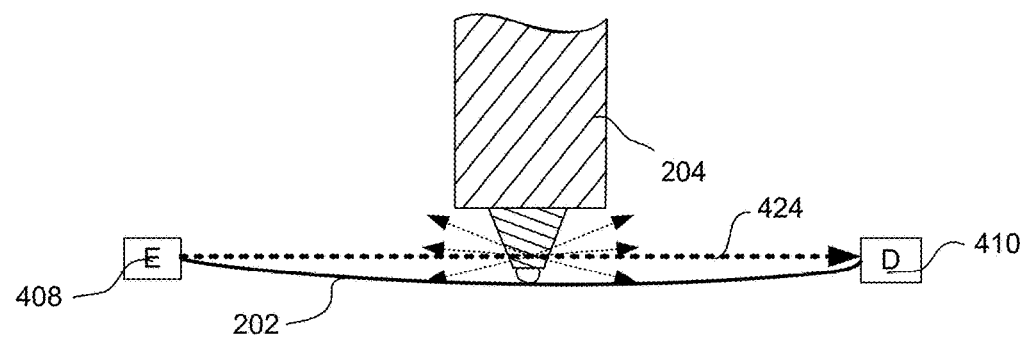

In yet another example demonstrated in FIG. 4K, where the identification feature 222 comprises QD material, one or more emitters 408 emit light rays 424 into the touch area 202. The light rays 424 enter the tip 220 of the pointer 204 and interact with the QD material 232. The QD material 232 fluoresces secondary rays 437 of a particular frequency of light in a plurality of directions. The secondary rays 437 are then received by one or more of the detectors 410. The one or more detectors 410 are capable of determining the frequency of the secondary rays 437 as a different frequency than the light rays 424 emitted by the emitters 408. One such method is having a filter (not shown) over one of the detectors 410 that permits the secondary rays 437 to pass therethrough while blocking the light rays 424 from the emitters 408. In an alternative shown in FIG. 4L, the flat touch area 202 has been replaced with a concave curved touch area 202 demonstrating the QD material 232 of sufficient length for the QD material 232 to be activated by the emitted light rays 424. The length of the QD material is determined based on the depth of the curvature of the touch area 202 beneath the emitter 408 and detector 410.

In yet another example, emitter activation signal activating a particular emitter (e.g. activated emitter) 408 generates light that would be reflected by a pointer 204 having the micro-machined reflective surface (e.g. reflector), and detected by one or more detectors 410. The processing structure 300 is able to determine which reflective pointer 204 is used based on the activated emitter 408, and the individual detectors 410 that received reflected light. Different reflective pointers 204 reflecting at different angles, would cause different sets of detectors 410 to detect light, thereby allowing the processing structure 300 to determine the identity of the pointer 204 used.

In yet another example demonstrated in FIG. 4K, where the identification feature 232 comprises QD material, one or more emitters 408 emit light rays 424 into the touch area 202. The light rays 424 enter the tip 220 of the pointer 204 and interact with the QD material 232. The QD material 232 fluoresces secondary rays 437 of a particular frequency of light in a plurality of directions. The secondary rays 437 are then received by one or more of the detectors 410. The one or more detectors 410 are capable of determining the frequency of the secondary rays 437 as a different frequency than the light rays 424 emitted by the emitters 408. One such method is having a filter (not shown) over one of the detectors 410 that permits the secondary rays 437 to pass therethrough while blocking the light rays 424 from the emitters 408. In an alternative shown in FIG. 4L, the flat touch area 202 has been replaced with a concave curved touch area 202 demonstrating the QD material 232 of sufficient length for the QD material 232 to be activated by the emitted light rays 424. The length of the QD material is determined based on the depth of the curvature of the touch area 202 beneath the emitter 408 and detector 410.

Similarly, in embodiments utilizing semitransparent pointers 204, pointer identification may be achieved by the amount (or intensity) of light that passes through translucent or semitransparent pointer 204 as described above. Given the activated emitter 408 and a plurality of detected signals from the detectors 410, the processing structure 300 can identify the individual semitransparent pointer 204 used.

The components of an example mobile device 500 is further disclosed in FIG. 5 having a processor 502 executing instructions from volatile or non-volatile memory 504 and storing data thereto. The mobile device 500 has a number of human-computer interfaces such as a keypad or touch screen 506, a microphone and/or camera 508, a speaker or headphones 510, and a display 512, or any combinations thereof. The mobile device has a battery 514 supplying power to all the electronic components within the device. The battery 514 may be charged using wired or wireless charging.

The keyboard 506 could be a conventional keyboard found on most laptop computers or a soft-form keyboard constructed of flexible silicone material. The keyboard 506 could be a standard-sized 101-key or 104-key keyboard, a laptop-sized keyboard lacking a number pad, a handheld keyboard, a thumb-sized keyboard or a chorded keyboard known in the art. Alternatively, the mobile device 500 could have only a virtual keyboard displayed on the display 512 and uses a touch screen 506. The touch screen 506 can be any type of touch technology such as analog resistive, capacitive, projected capacitive, ultrasonic, infrared grid, camera-based (across touch surface, at the touch surface, away from the display, etc), in-cell optical, in-cell capacitive, in-cell resistive, electromagnetic, time-of-flight, frustrated total internal reflection (FTIR), diffused surface illumination, surface acoustic wave, bending wave touch, acoustic pulse recognition, force-sensing touch technology, or any other touch technology known in the art. The touch screen 506 could be a single touch or multi-touch screen. Alternatively, the microphone 508 may be used for input into the mobile device 500 using voice recognition.

The display 512 is typically small-size between the ranges of 1.5 inches to 14 inches to enable portability and has a resolution high enough to ensure readability of the display 512 at in-use distances. The display 512 could be a liquid crystal display (LCD) of any type, plasma, e-Ink®, projected, or any other display technology known in the art. If a touch screen 506 is present in the device, the display 512 is typically sized to be approximately the same size as the touch screen 506. The processor 502 generates a user interface for presentation on the display 512. The user controls the information displayed on the display 512 using either the touch screen or the keyboard 506 in conjunction with the user interface. Alternatively, the mobile device 500 may not have a display 512 and rely on sound through the speakers 510 or other display devices to present information.

The mobile device 500 has a number of network transceivers coupled to antennas for the processor to communicate with other devices. For example, the mobile device 500 may have a near-field communication (NFC) transceiver 520 and antenna 540; a WiFi®/Bluetooth® transceiver 522 and antenna 542; a cellular transceiver 524 and antenna 544 where at least one of the transceivers is a pairing transceiver used to pair devices. The mobile device 500 optionally also has a wired interface 530 such as USB or Ethernet connection.

Figure 6:
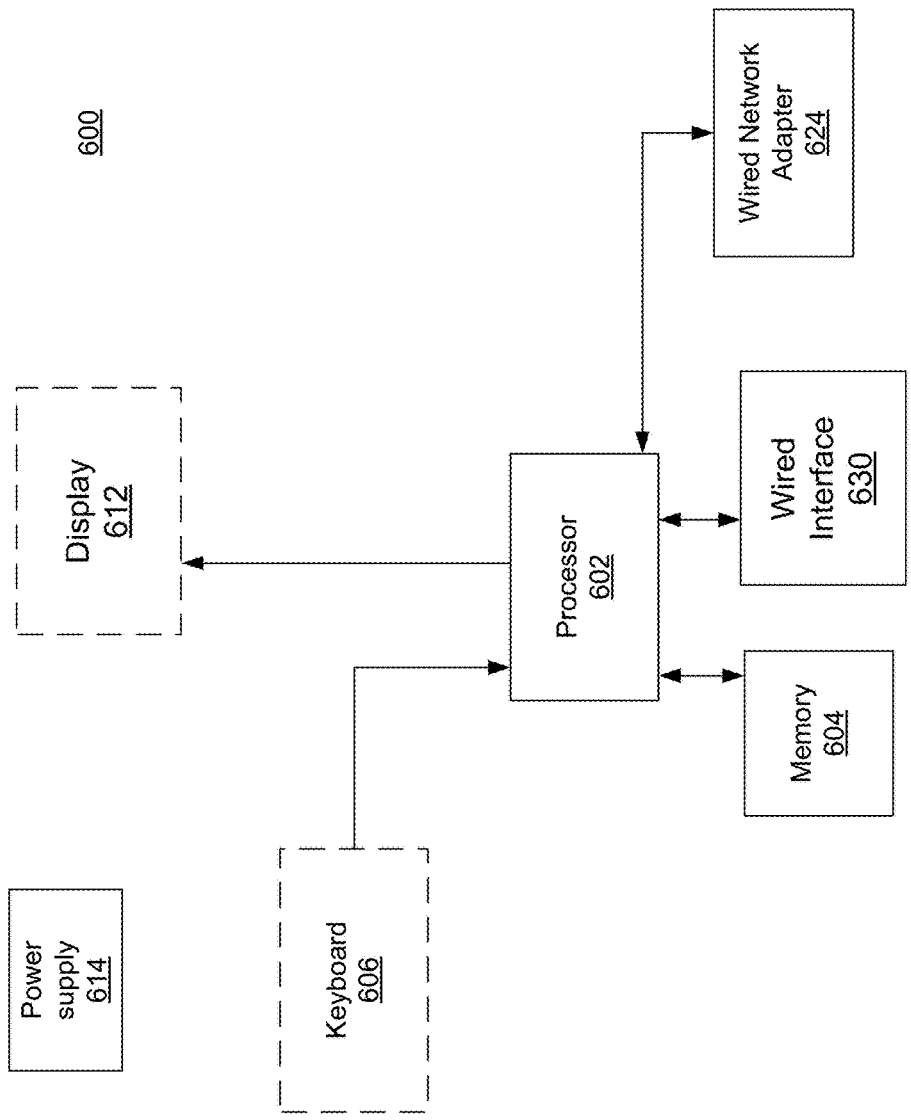
FIG. 6 shows a processing structure of one of more servers.

The servers 120, 122, 124 shown in FIG. 6 of the present embodiment have a similar structure to each other. The servers 120, 122, 124 have a processor 602 executing instructions from volatile or non-volatile memory 604 and storing data thereto. The servers 120, 122, 124 may or may not have a keyboard 306 and/or a display 312. The servers 120, 122, 124 communicate over the Internet 150 using the wired network adapter 624 to exchange information with the paired mobile device 105 and/or the capture board 108, conferencing, and sharing of captured content. The servers 120, 122, 124 may also have a wired interface 630 for connecting to backup storage devices or other type of peripheral known in the art. A wired power supply 614 supplies power to all of the electronic components of the servers 120, 122, 124.

Figure 7A:
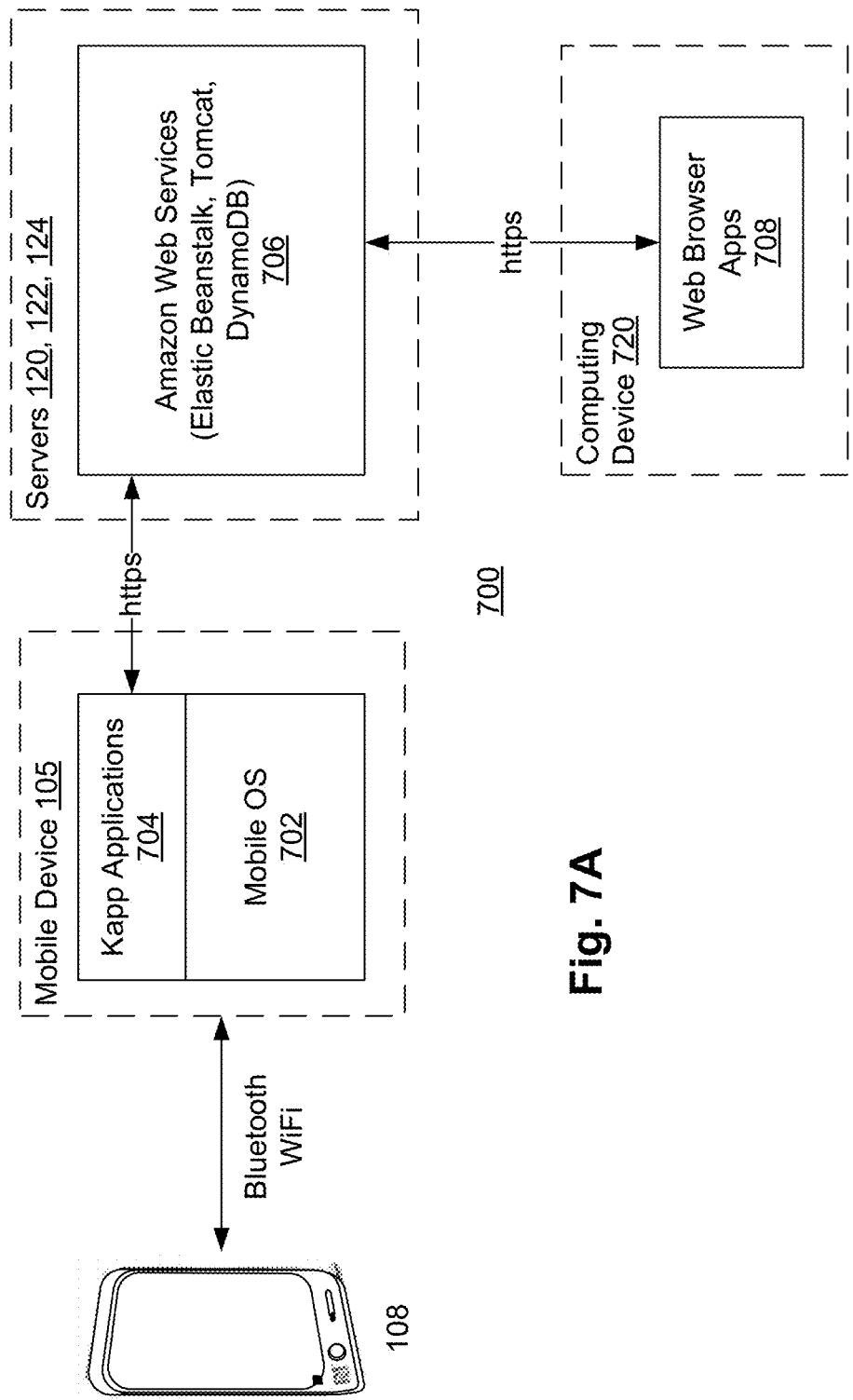
FIGS. 7A and 7B demonstrate an overview of processing structure and protocol stack of a communication system.
Figure 7B:
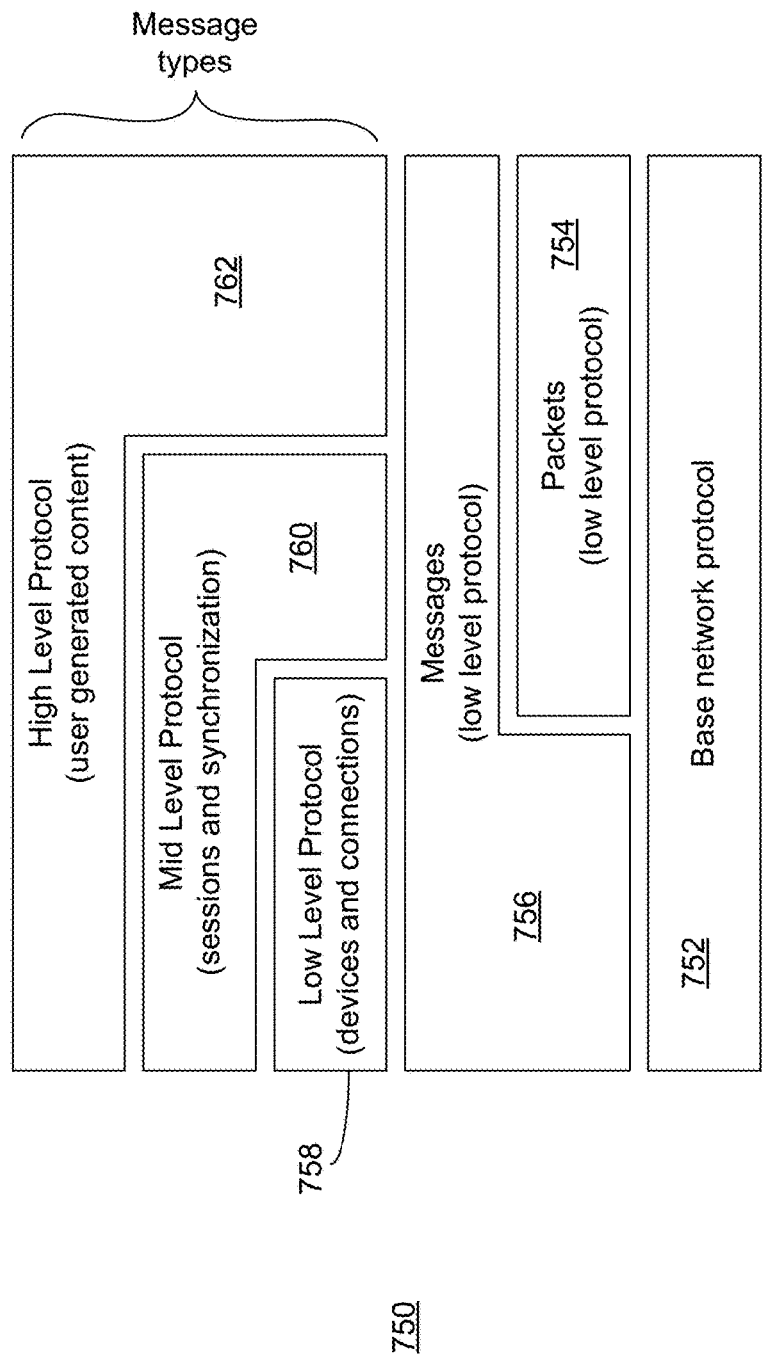

An overview of the system architecture 700 is presented in FIGS. 7A and 7B. The capture board 108 is paired with the mobile device 105 to create one or more wireless communications channels between the two devices. The mobile device 105 executes a mobile operating system (OS) 702 which generally manages the operation and hardware of the mobile device 105 and provides services for software applications 704 executing thereon. The software applications 704 communicate with the servers 120, 122, 124 executing a cloud-based execution and storage platform 706, such as for example Amazon Web Services, Elastic Beanstalk, Tomcat, DynamoDB, etc, using a secure hypertext transfer protocol (https). Any content stored on the cloud-based execution and storage platform 706 may be accessed using an HTML5-capable web browser application 708, such as Chrome, Internet Explorer, Firefox, etc, executing on a computer device 720. When the mobile device 105 connects to the capture board 108 and the servers 120, 122, 124, a session is generated as further described below. Each session has a unique session identifier.

FIG. 7B shows an example protocol stack 750 used by the devices connected to the session. The base network protocol layer 752 generally corresponds to the underlying communication protocol, such as for example, Bluetooth, WiFi Direct, WiFi, USB, Wireless USB, TCP/IP, UDP/IP, etc. and may vary based by the type of device. The packets layer 754 implement secure, in-order, reliable stream-oriented full-duplex communication when the base networking protocol 752 does not provide this functionality. The packets layer 754 may be optional depending on the underlying base network protocol layer 752. The messages layer 756 in particular handles all routing and communication of messages to the other devices in the session. The low level protocol layer 758 handles redirecting devices to other connections. The mid level protocol layer 760 handles the setup and synchronization of sessions. The High Level Protocol 762 handles messages relating the user generated content as further described herein.

Figure 8:
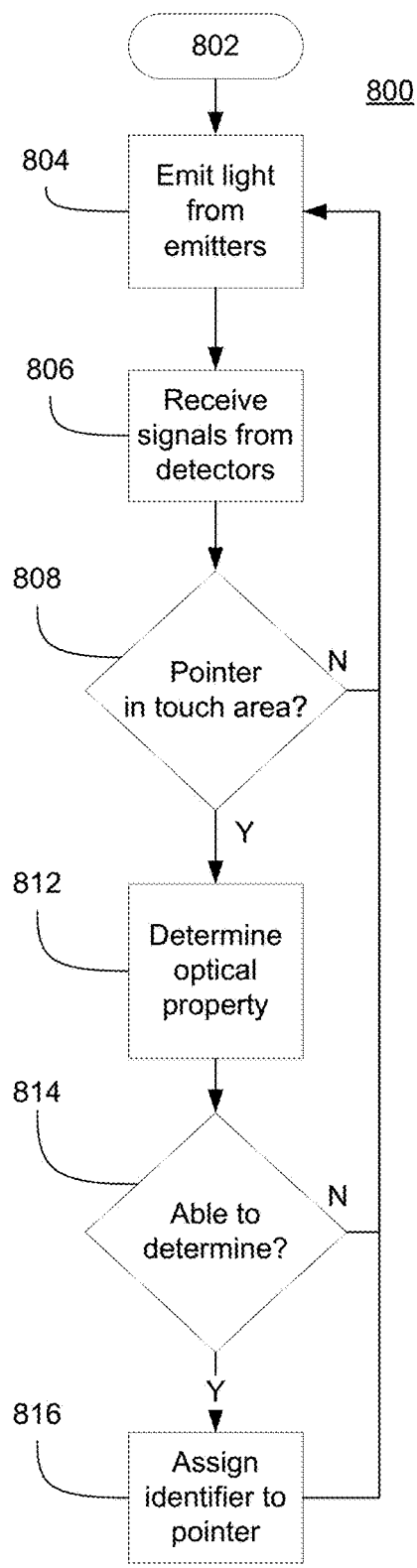
FIG. 8 shows a flowchart of a control method for determining an optical property of a pointer.

In operation, as shown with reference to FIG. 8, the processing structure 300 causes light to be emitted from the emitters 408 by sending a signal to the emitters 408 according to a sequence or pattern (step 804). The processing structure 300 then receives the resultant signals from the detectors 410 (step 806). The processing structure 300 then determines if a pointer was present in the touch area 202 (step 808). For each pointer 204, the processing structure 300 determines the optical property of pointer 204 using one or more of the techniques described herein and determines its position (step 812). If it is able to determine an optical property (step 814), then the processing structure 300 assigns a unique pointer identifier to each pointer (step 816) and relays this unique pointer identifier and pointer location to the processor 502 of the mobile device 500 (not shown). The processing structure 300 may additionally transmit a set of pointer attributes, such as colour, line type, line thickness, etc. at periodic intervals or during connection of the mobile device 500 with the processing structure 300 (not shown). The processing structure 300 continues to track each unique pointer 204 relaying the coordinates to the mobile device 500 in real-time (by returning to step 804).

In some example, the pointer 204 may be associated with a user profile stored on an authentication server 120 as adapted from and further described in U.S. Patent Publication No. 2016/0179335 to SMART Technologies, filed Dec. 18, 2014, herein incorporated by reference in its entirety. The users may register their mobile device 105 with the capture board 108 using the QR code or NFC, or alternatively using a conventional username and password for authorization and/or authentication. The authentication information may then be transmitted to the authentication server 120 to authenticate the mobile device 105 and capture board 108 with an account identifier. The capture board 108 receives authorization from the authentication server 120. The mobile device 105 then may associate the unique pointer identifier of the pointer 204 with the account and workspace. The authentication server 120 notifies the profile server 122 of the authenticated devices 105 and 108 and the unique pointer identifier. The profile server 122 transfers the profile information of the user over the Internet 150 to the wired network adapter 224 of the mobile device 105 and/or the capture board 108. A profile application executing on the mobile device 105 retrieves the profile information and based on the profile information, generates a workspace for the user and customizes the pointer 204 attributes which may be relayed to the capture board 108. The workspaces may be a personal workspace or a collaborative workspace.

For a personal workspace, there is one master workspace layer generated and others contribute to that master workspace layer. This type of personal workspace could be suitable in an educational environment where the teacher is the primary user of the workspace but could allow others, such as students, to contribute to the master workspace layer. The teacher could have a pen that could be uniquely identified as having teacher access whereas the students' pens could be identified as having limited access or functionality. For a collaborative environment, each user has their own workspace layer where the users have uniquely identifiable pointers and are differentiated from each other. In such a system, the users have generally equal access to their own workspace layers but could have limited access to other workspace layers. The workspace layer could occupy the entire touch area 202 and user interface of capture board 108 (if applicable) or be a portion of the touch area 202 depending on whether or not other users are currently using the capture board 108. The workspace layer could optionally be displayed proximal to where the pointer 204 contacted the touch surface or touch screen 202.

Although the embodiments described herein teach particular mathematical algorithms, other mathematical techniques and/or approximations may be used. Although the embodiments described herein may refer to light rays or light waves, the wave-particle duality of light and, as such, methods described with reference to light rays may be mathematically defined using light waves and vice versa.

Although the pointer identification techniques are described herein without relation to each other, the techniques may be combined. For example, some pointers 204 may alter the angle of the light rays while other pointers may use QD materials. Alternatively, some pointers 204 may incorporate QD material, reflectors, transparency, and/or refraction within the same pointer 204. In yet another alternative, the QD-generated light may be emitted at a particular angle in response to light from the emitters 408.

Although the embodiments described herein refer to a pen, the pointer 204 may be any type of pointing device such as a dry erase marker, ballpoint pen, ruler, pencil, finger, thumb, or any other generally elongate member having one or more of the pointer identification features as described herein. These pen-type devices have one or more ends configured of a material as to not damage the touch area 202 when coming into contact therewith under in-use forces.

The emitters and detectors may be narrower or wider, narrower angle or wider angle, various wavelengths, various powers, coherent or not, etc. As another example, different types of multiplexing may be used to allow light from multiple emitters to be received by each detector. In another alternative, the FPGA 302 may modulate the light emitted by the emitters to enable multiple emitters to be active at once. The pattern of the emitters and detectors shown herein are simply examples, other examples may have the emitters along one two sides of the board with detectors along the opposing sides. Different manners of interleaving the detectors and sensors are also possible. The detectors may be clustered together and the detectors may be clustered together. The clusters may also be interleaved with respect to each other.

The pointer 204 herein may further comprise polarizers as a film over or incorporated into the identification feature 222.

The touch screen 306 can be any type of optical touch technology such as infrared grid, camera-based (across touch surface, at the touch surface, away from the display, etc), in-cell optical, in-cell capacitive, in-cell resistive, time-of-flight, frustrated total internal reflection (FTIR), diffused surface illumination, or any other optical touch technology known in the art. The touch screen 306 could be a single touch, a multi-touch screen, or a multi-user, multi-touch screen.

Although the mobile device 200 is described as a smartphone 102, tablet 104, or laptop 106, in alternative embodiments, the mobile device 105 may be built into a conventional pen, a card-like device similar to an RFID card, a camera, or other portable device.

Although the servers 120, 122, 124 are described herein as discrete servers, other combinations may be possible. For example, the three servers may be incorporated into a single server, or there may be a plurality of each type of server in order to balance the server load.

These interactive input systems include but are not limited to: touch systems comprising touch panels employing analog resistive or machine vision technology to register pointer input such as those disclosed in U.S. Pat. Nos. 5,448,263; 6,141,000; 6,337,681; 6,747,636; 6,803,906; 7,232,986; 7,236,162; 7,274,356; and 7,532,206 assigned to SMART Technologies ULC of Calgary, Alberta, Canada, assignee of the subject application, the entire disclosures of which are incorporated by reference; touch systems comprising touch panels or tables employing electromagnetic, capacitive, acoustic or other technologies to register pointer input; laptop and tablet personal computers (PCs); smartphones, personal digital assistants (PDAs) and other handheld devices; and other similar devices.

Although the embodiments described herein pair using NFC or QR code, other means of communication may be used for pairing and general communication between the devices, such as, but not limited to, WiFi, Bluetooth, WiFi Direct, LTE, 3G, wired Ethernet, Infrared, 1-dimensional bar code, etc.

Although the examples described herein are in reference to a capture board 108, the features and concepts may apply equally well to other collaborative devices 107 such as the interactive flat screen display 110, interactive whiteboard 112, the interactive table 114, or other type of interactive device. Each type of collaborative device 107 may have the same protocol level or different protocol levels.

The above-described embodiments are intended to be examples of the present invention and alterations and modifications may be effected thereto, by those of skill in the art, without departing from the scope of the invention, which is defined solely by the claims appended hereto.

What is claimed is:

1. An interactive device comprising:
a touch area;
a plurality of emitters on a periphery of the touch area; the emitters emitting an intensity of a light into the touch area;
a plurality of pointers having a distinct optical property responsive to the light;
the distinct optical property of each pointer of the plurality of pointers reduces the intensity of the light passing through each pointer of the plurality of pointers by different amounts;
at least one detector directed towards the touch area;
a processing structure in communication with the emitters and the at least one detector;
a tangible computer-readable medium in communication with the processing structure, the medium comprising instructions to configure the processing structure to:
transmit an emitter activation signal to at least one of the emitters initiating emission of the light;
receive at least one detector signal from the at least one detector; and determine the distinct optical property from the at least one detector signal.

2. The interactive device according to claim 1, wherein the medium further comprises instructions to configure the processing structure to determine the intensity of the light reduction for a particular one of the plurality of pointers based on the at least one detector signal compared to at least one threshold.

3. The interactive device according to claim 1, wherein the medium further comprises instructions to configure the processing structure to determine the intensity of the light reduction by calculating an incident field, a scattered field, and an internal field based on the at least one detector signal of a particular one of the plurality of pointers.

4. The interactive device according to claim 1, wherein the distinct optical property of each pointer of the plurality of pointers refracts the light passing through each pointer of the plurality of pointers according to a different refraction profile.

5. The interactive device according to claim 4, wherein the medium further comprises instructions to configure the processing structure to determine the different refraction profile for at least one of the plurality of pointers based on the at least one detector signal.

6. The interactive device according to claim 4, wherein the medium further comprises instructions to configure the processing structure to determine the different refraction profile from incident waves and scattered waves.

7. The interactive device according to claim 1, wherein each pointer of the plurality of pointers reflects the light at a reflection angle; each of the reflection angles being different.

8. The interactive device according to claim 7, wherein the medium further comprises instructions to configure the processing structure to determine the reflection angle for at least one of the plurality of pointers based on the at least one detector signal.

9. The interactive device according to claim 1, wherein the distinct optical property is located at a tip of at least one of the plurality of pointers.

10. The interactive device according to claim 1, wherein the distinct optical property comprises a quantum dot material.

11. The interactive device according to claim 10, wherein for each pointer of the plurality of pointers, the quantum dot material emits a different frequency light than the light emitted by the emitters in response to the intensity of the light from the emitters.

12. The interactive device according to claim 11, wherein the medium further comprises instructions to configure the processing structure to determine the different frequency light emitted from the quantum dot material for at least one of the plurality of pointers based on the at least one detector signal.

13. The interactive device according to claim 1, wherein each of the plurality of emitters comprises a first light emitting diode, a second light emitting diode, and a third light emitting diode; the first light emitting diode radiates the intensity of the light with a peak intensity at 780-nm; the second light emitting diode radiates the intensity of the light with a peak intensity at 850-nm; and the third light emitting diode radiates the intensity of the light at a peak intensity at 940-nm.

14. The interactive device according to claim 13, wherein the plurality of pointers comprise an eraser, a first pointer, and a second pointer; wherein the eraser attenuates the intensity of the light having a wavelength of 850 nm and 940 nm; the first pointer attenuates the intensity of the light having a wavelength of 780 nm; and the second pointer attenuates the intensity of the light having a wavelength of 780 nm and 850 nm.

15. A method of identifying and tracking each pointer of a plurality of pointers in an interactive device comprising:
emitting a light from emitters according to a pattern;
receiving signals from detectors at a processing structure;
processing the signals to detect and locate each pointer of the plurality of pointers contacting a touch area; and
determining a distinct optical property of each pointer of the plurality of pointers contacting the touch area;
wherein the distinct optical property is selected from at least one of: a different reduction of an intensity of the light passing through each pointer of the plurality of pointers; a different refraction profile of the light passing through each pointer of the plurality of pointers; and a different reflection angle of the light for each pointer of the plurality of pointers.

16. An interactive device comprising:
emitters on a periphery of a touch area; the emitters emitting an intensity of electromagnetic radiation into the touch area;
pointers having a distinct optical property responsive to the electromagnetic radiation;
detectors directed towards the emitters;
a processing structure in communication with the emitters and the detectors;
a tangible computer-readable medium in communication with the processing structure, the medium comprising instructions to configure the processing structure to:
transmit an electrical signal to at least one of the emitters causing emission of the electromagnetic radiation;
receive detector signals from the detectors; and
determine the distinct optical property from the detector signals;
wherein the distinct optical property is selected from at least one of: a different reduction of the intensity of the electromagnetic radiation passing through each pointer of the pointers; a different refraction profile of the electromagnetic radiation passing through each pointer of the pointers; and a different reflection angle of the electromagnetic radiation for each pointer of the pointers.

17. An interactive device comprising:
a touch area;
a plurality of emitters on a periphery of the touch area; the emitters emitting an intensity of light into the touch area;
a plurality of pointers having a distinct optical property responsive to the light; the distinct optical property of each pointer of the plurality of pointers refracts the light passing through each pointer of the plurality of pointers according to a different refraction profile;
at least one detector directed towards the touch area;
a processing structure in communication with the emitters and the at least one detector;
a tangible computer-readable medium in communication with the processing structure, the medium comprising instructions to configure the processing structure to:
transmit an emitter activation signal to at least one of the emitters initiating emission of the light;
receive at least one detector signal from the at least one detector; and
determine the distinct optical property from the at least one detector signal.

18. The interactive device according to claim 17, wherein the distinct optical property reduces the intensity of the light passing through each pointer of the plurality of pointers.

19. The interactive device according to claim 18, wherein the distinct optical property of each pointer of the plurality of pointers reduces the intensity of the light passing through each pointer of the plurality of pointers by different amounts.

20. The interactive device according to claim 19, wherein the medium further comprises instructions to configure the processing structure to determine the intensity of the light reduction for a particular one of the plurality of pointers based on the at least one detector signal compared to at least one threshold.

21. The interactive device according to claim 19, wherein the medium further comprises instructions to configure the processing structure to determine the intensity of the light reduction by calculating an incident field, a scattered field, and an internal field based on the at least one detector signal of a particular one of the plurality of pointers.

22. The interactive device according to claim 17, wherein the medium further comprises instructions to configure the processing structure to determine the different refraction profile for at least one of the plurality of pointers based on the at least one detector signal.

23. The interactive device according to claim 17, wherein the medium further comprises instructions to configure the processing structure to determine the different refraction profile from incident waves and scattered waves.

24. The interactive device according to claim 17, wherein each pointer of the plurality of pointers reflects the light at different angles.

25. The interactive device according to claim 24, wherein the medium further comprises instructions to configure the processing structure to determine a reflection angle for at least one of the plurality of pointers based on the at least one detector signal.

26. The interactive device according to claim 17, wherein the distinct optical property is located at a tip of at least one of the plurality of pointers.

27. The interactive device according to claim 17, wherein the distinct optical property comprises a quantum dot material.

28. The interactive device according to claim 27, wherein for each pointer of the plurality of pointers, the quantum dot material emits a different frequency light than the light of the emitters in response to the light from the emitters.

29. The interactive device according to claim 28, wherein the medium further comprises instructions to configure the processing structure to determine the different frequency light emitted from the quantum dot material for at least one of the plurality of pointers based on the at least one detector signal.

30. The interactive device according to claim 17, wherein each of the plurality of emitters comprises a first light emitting diode, a second light emitting diode, and a third light emitting diode; the first light emitting diode radiates the intensity of the light with a peak intensity at 780-nm; the second light emitting diode radiates the intensity of the light with a peak intensity at 850-nm; and the third light emitting diode radiates the intensity of the light at a peak intensity at 940-nm.

31. The interactive device according to claim 30, wherein the plurality of pointers comprise an eraser, a first pointer, and a second pointer; wherein the eraser attenuates the intensity of the light having a wavelength of 850 nm and 940 nm; the first pointer attenuates the intensity of the light having a wavelength of 780 nm; and the second pointer attenuates the intensity of the light having a wavelength of 780 nm and 850 nm.

32. An interactive device comprising:
a touch area;
a plurality of emitters on a periphery of the touch area; the emitters emitting an intensity of a light into the touch area;
a plurality of pointers having a distinct optical property responsive to the light; the distinct optical property of each pointer of the plurality of pointers reflects the light at a different reflection angle;
at least one detector directed towards the touch area;
a processing structure in communication with the emitters and the at least one detector;
a tangible computer-readable medium in communication with the processing structure, the medium comprising instructions to configure the processing structure to:
transmit an emitter activation signal to at least one of the emitters initiating emission of the light;
receive at least one detector signal from the at least one detector;
determine the distinct optical property from the at least one detector signal; and
determine the different reflection angle for at least one of the plurality of pointers based on the at least one detector signal.

33. The interactive device according to claim 32, wherein the distinct optical property reduces the intensity of light passing through each pointer of the plurality of pointers.

34. The interactive device according to claim 33, wherein the distinct optical property of each pointer of the plurality of pointers reduces the intensity of the light passing through each pointer of the plurality of pointers by different amounts.

35. The interactive device according to claim 34, wherein the medium further comprises instructions to configure the processing structure to determine the intensity of the light reduction for a particular one of the plurality of pointers based on the at least one detector signal compared to at least one threshold.

36. The interactive device according to claim 33, wherein the medium further comprises instructions to configure the processing structure to determine the intensity of the light reduction by calculating an incident field, a scattered field, and an internal field based on the at least one detector signal of a particular one of the plurality of pointers.

37. The interactive device according to claim 32, wherein the distinct optical property refracts the light passing through each pointer of the plurality of pointers.

38. The interactive device according to claim 37, wherein the distinct optical property of each pointer of the plurality of pointers refracts the light passing through each pointer of the plurality of pointers according to a different refraction profile.

39. The interactive device according to claim 38, wherein the medium further comprises instructions to configure the processing structure to determine the different refraction profile for at least one of the plurality of pointers pointers based on the at least one detector signal.

40. The interactive device according to claim 38, wherein the medium further comprises instructions to configure the processing structure to determine the different refraction profile from incident waves and scattered waves.

41. The interactive device according to claim 32, wherein the distinct optical property is located at a tip of at least one of the plurality of pointers.

42. The interactive device according to claim 32, wherein the distinct optical property comprises a quantum dot material.

43. The interactive device according to claim 42, wherein for each pointer of the plurality of pointers, the quantum dot material emits a different frequency light than the light of the emitters in response to the light from the emitters.

44. The interactive device according to claim 43, wherein the medium further comprises instructions to configure the processing structure to determine the different frequency light emitted from the quantum dot material for at least one of the plurality of pointers based on the at least one detector signal.

45. The interactive device according to claim 32, wherein each of the plurality of emitters comprises a first light emitting diode, a second light emitting diode, and a third light emitting diode; the first light emitting diode radiates the intensity of the light with a peak intensity at 780-nm; the second light emitting diode radiates the intensity of the light with a peak intensity at 850-nm; and the third light emitting diode radiates the intensity of the light at a peak intensity at 940-nm.

46. The interactive device according to claim 45, wherein the plurality of pointers comprise an eraser, a first pointer, and a second pointer; wherein the eraser attenuates the intensity of the light having a wavelength of 850 nm and 940 nm; the first pointer attenuates the intensity of the light having a wavelength of 780 nm; and the second pointer attenuates the intensity of the light having a wavelength of 780 nm and 850 nm.

* * * * *